US012067940B2

(12) United States Patent
Ueno

(10) Patent No.: US 12,067,940 B2
(45) Date of Patent: Aug. 20, 2024

(54) DISPLAY DEVICE AND METHOD FOR DRIVING SAME

(71) Applicant: Sharp Kabushiki Kaisha, Sakai (JP)

(72) Inventor: Tetsuya Ueno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/801,820

(22) PCT Filed: Mar. 2, 2020

(86) PCT No.: PCT/JP2020/008716
§ 371 (c)(1),
(2) Date: Aug. 24, 2022

(87) PCT Pub. No.: WO2021/176528
PCT Pub. Date: Sep. 10, 2021

(65) Prior Publication Data
US 2023/0186848 A1 Jun. 15, 2023

(51) Int. Cl.
*G09G 3/3233* (2016.01)

(52) U.S. Cl.
CPC ... *G09G 3/3233* (2013.01); *G09G 2300/0452* (2013.01); *G09G 2300/0819* (2013.01);
(Continued)

(58) Field of Classification Search
CPC ...... G09G 3/20; G09G 3/3233; G09G 3/3614; G09G 3/3648; G09G 3/3677;
(Continued)

(56) References Cited

U.S. PATENT DOCUMENTS

2011/0025669 A1* 2/2011 Kwak .................. G09G 3/3225 345/82
2012/0001896 A1 1/2012 Han et al.
(Continued)

FOREIGN PATENT DOCUMENTS

JP 05-064108 A 3/1993
JP 2014-119574 A 6/2014
WO 2012/090814 A1 7/2012

OTHER PUBLICATIONS

Official Communication issued in International Patent Application No. PCT/JP2020/008716, mailed on Jun. 9, 2020.

*Primary Examiner* — Stacy Khoo
(74) *Attorney, Agent, or Firm* — Keating & Bennett, LLP

(57) ABSTRACT

The present application discloses a display device capable of satisfactorily displaying an image without causing insufficient charging even when it is difficult to ensure a time for sufficiently charging a holding capacitor of a pixel circuit. For each of m pixel circuit columns in a display portion 11, a data signal line group made up of a data signal line Doj connected to an odd-numbered pixel circuit in the pixel circuit column and a data signal line Dej connected to an even-numbered pixel circuit in the pixel circuit column, and a signal distributor 5*j* to which the data signal line group is connected are provided. A data-side drive circuit 30 provides data signals S1 to Sm to signal distributors 51 to 5*m*, respectively, and each signal distributor 5*j* distributes the provided data signal Sj to two data signal lines connected thereto. A scanning-side drive circuit 40 sequentially selects scanning signal lines GB1 to GBn such that a selection period of each scanning signal line GBi has a portion overlapping with a selection period of a scanning signal line GBi+1 to be selected next.

2 Claims, 12 Drawing Sheets

(52) U.S. Cl.
CPC ............... *G09G 2300/0842* (2013.01); *G09G 2310/0202* (2013.01); *G09G 2310/0297* (2013.01); *G09G 2310/08* (2013.01)

(58) Field of Classification Search
CPC ......... G09G 3/3688; G09G 2300/0452; G09G 2300/0819; G09G 2300/0842; G09G 2310/0202; G09G 2310/0297; G09G 2310/08
See application file for complete search history.

(56) References Cited

U.S. PATENT DOCUMENTS

| | | | | |
|---|---|---|---|---|
| 2013/0271436 | A1 | 10/2013 | Shiomi | |
| 2014/0168195 | A1 | 6/2014 | Kumeta et al. | |
| 2019/0206966 | A1 | 7/2019 | Kim et al. | |
| 2019/0228726 | A1* | 7/2019 | Ono | G09G 3/3291 |

* cited by examiner

DISPLAY DEVICE AND METHOD FOR DRIVING SAME

TECHNICAL FIELD

The disclosure relates to a display device and more particularly to a display device, such as an organic electroluminescence (EL) display device of an internal compensation system, in which it is not easy to ensure a sufficient time for writing data into a pixel circuit.

BACKGROUND ART

In recent years, an organic EL display device provided with a pixel circuit including an organic EL element (also referred to as an organic light-emitting diode (OLED)) has been put into practical use. The pixel circuit of the organic EL display device includes, in addition to the organic EL element, a drive transistor, a writing control transistor, a holding capacitor, and the like. A thin-film transistor is used for the drive transistor and the writing control transistor, the holding capacitor is connected to a gate terminal serving as the control terminal of the drive transistor, and a voltage corresponding to a video signal representing an image to be displayed (more specifically, a voltage indicating a gradation value of a pixel to be formed in the pixel circuit) is provided as a data voltage to the holding capacitor from a drive circuit via a data signal line. The organic EL element is a self-emitting display element that emits light with a luminance corresponding to a current flowing therethrough. The drive transistor is provided in series with the organic EL element and controls the current flowing through the organic EL element in accordance with the voltage held in the holding capacitor.

Variations or shifts occur in the characteristics of the organic EL element and the drive transistor. Thus, for performing a high-quality display in the organic EL display device, it is necessary to compensate for variations and shifts in the characteristics of these elements. As for the organic EL display device, a method of compensating for the characteristics of the element inside the pixel circuit and a method of compensating for the characteristics outside the pixel circuit are known. As a pixel circuit corresponding to the former method, there is known a pixel circuit configured to initialize a voltage at a gate terminal of a drive transistor, that is, a voltage held in a holding capacitor, and then charge the holding capacitor with a data voltage via the drive transistor in a diode-connected state. On the inside of such a pixel circuit, variations and shifts in the threshold voltage of the drive transistor are compensated for (hereinafter, the compensation for the variations and shifts in the threshold voltage will be referred to as "threshold compensation").

A matter related to an organic EL display device of a system for performing threshold compensation in a pixel circuit as described above (hereinafter referred to as an "internal compensation system") is described in, for example, Patent Document 1. In other words, Patent Document 1 discloses several pixel circuits each configured to initialize a voltage at a gate terminal of a drive transistor, that is, a voltage held in a holding capacitor, to a predetermined level, and then charge the holding capacitor with a data voltage via the drive transistor in a diode-connected state.

Patent Document 2 describes a configuration related to the organic EL display device disclosed in the present application. Patent Document 2 discloses a drive circuit for a liquid crystal TV that includes a data-side driver and a scanning-side driver independently for each of an odd-line pixel group and an even-line pixel group of a liquid crystal panel and can independently and simultaneously drive the odd-line pixel group and the even-line pixel group. Note that a configuration for simultaneously driving the odd-line pixel group and the even-line pixel group as described above is also disclosed in Patent Document 3.

CITATION LIST

Patent Documents

[Patent Document 1] U.S. Patent No. 2012/0001896
[Patent Document 2] Japanese Laid-Open Patent Publication No. 5-64108
[Patent Document 3] WO 2012/090814

SUMMARY

Technical Problem

In the organic EL display device of the internal compensation system, when data is written to any pixel circuit, a data voltage is provided to the pixel circuit from the data-side drive circuit via the data signal line, and in the pixel circuit, the data voltage is provided to the holding capacitor via the drive transistor. When the data voltage is provided to the holding capacitor via the drive transistor in this manner, the time required for charging the holding capacitor in data writing is longer than that when the internal compensation system is not adopted. Therefore, in data writing, the holding capacitor in the pixel circuit may not be sufficiently charged, and as a result, an image may not be satisfactorily displayed on the display portion.

Therefore, even in a case where it is difficult to ensure the time for sufficiently charging the holding capacitor in the pixel circuit as in a case where the internal compensation system is adopted in a current drive type display device such as the organic EL display device, it is desirable to display an image satisfactorily without causing insufficient charging.

Solution to Problem

Several embodiments of the disclosure provide a display device including a plurality of data signal lines, a plurality of scanning signal lines intersecting the plurality of data signal lines, and a plurality of pixel circuits arranged along the plurality of data signal lines and the plurality of scanning signal lines, the display device including:

a data-side drive circuit configured to output a plurality of data signals representing an image to be displayed;

a signal distribution circuit configured to receive the plurality of data signals and provide the plurality of data signals to the plurality of data signal lines; and a scanning-side drive circuit configured to selectively drive the plurality of scanning signal lines such that a selection period of each of the scanning signal lines has a portion overlapping with a selection period of a scanning signal line to be selected next, wherein two or more data signal lines correspond to one pixel circuit column in a plurality of pixel circuit columns constituted by the plurality of pixel circuits and extending along the plurality of data signal lines, the two or more data signal lines are respectively connected to two or more-pixel circuit groups obtained by grouping pixel circuits constituting the one pixel circuit column, the plurality of scanning signal lines are respectively connected to a plurality of pixel circuits constituting each of the plurality of pixel circuit columns, and the signal distribution circuit distributes one data signal among the plurality of data signals to the two or more data signal lines.

Other several embodiments of the disclosure provide a method for driving a display device including a plurality of data signal lines, a plurality of scanning signal lines intersecting the plurality of data signal lines, and a plurality of pixel circuits arranged along the plurality of data signal lines and the plurality of scanning signal lines, the method including:

a data-side driving step of outputting a plurality of data signals representing an image to be displayed;

a signal distribution step of receiving the plurality of data signals and providing the plurality of data signals to the plurality of data signal lines; and a scanning-side driving step of selectively driving the plurality of scanning signal lines such that a selection period of each of the scanning signal lines has a portion overlapping with a selection period of a scanning signal line to be selected next, wherein two or more data signal lines correspond to one pixel circuit column in a plurality of pixel circuit columns constituted by the plurality of pixel circuits and extending along the plurality of data signal lines, the two or more data signal lines are respectively connected to two or more pixel circuit groups obtained by grouping pixel circuits constituting the one pixel circuit column, the plurality of scanning signal lines are respectively connected to a plurality of pixel circuits constituting each of the plurality of pixel circuit columns, and in the signal distribution step, one data signal among the plurality of data signals is distributed to the two or more data signal lines.

Effects of the Disclosure

According to the above several embodiments of the disclosure, in a plurality of pixel circuit columns that is constituted by a plurality of pixel circuits arranged along a plurality of scanning signal lines and extends along the data signal lines, two or more data signal lines correspond to one pixel circuit column, and the two or more data signal lines are respectively connected to two or more pixel circuit groups obtained by grouping pixel circuits constituting the one pixel circuit column. The plurality of scanning signal lines are respectively connected to a plurality of pixel circuits constituting each pixel circuit column. In a display portion configured as described above, the plurality of scanning signal lines are selectively driven such that a selection period of each scanning signal line has a portion overlapping with a selection period of a scanning signal line to be selected next, and one data signal among the plurality of data signals representing the image to be displayed is distributed to the two or more data signal lines. Thereby, one of the voltages respectively held in the two or more data signal lines is written as a data voltage to the pixel circuit connected to the scanning signal line in the selected state among the two or more pixel circuit groups respectively connected to the two or more data signal lines in the one pixel circuit column on the basis of the distribution of the one data signal to the two or more data signal lines. Since the selection period of each scanning signal line has a portion overlapping with the selection period of the scanning signal line to be selected next, the writing period of the data voltage from the data signal line to each pixel circuit in the one pixel circuit column has a portion overlapping with the writing period of the data voltage from another data signal line to another pixel circuit in the one pixel circuit column and is a longer period than the known one. As a result, for example, even when sufficient data writing to a pixel circuit is not easy as in the display device adopting the internal compensation system (when insufficient charging of the holding capacitor in the pixel circuit easily occurs), it is possible to appropriately write data and display a good image. The data signal output from the data-side drive circuit is provided to the data signal line via the signal distribution circuit, so that a data-side drive circuit similar to the known one can be used even when the display portion is configured as described above.

DESCRIPTION OF EMBODIMENTS

The embodiments will be described below with reference to the accompanying drawings. In each transistor described below, a gate terminal corresponds to a control terminal, one of a drain terminal and a source terminal corresponds to a first conductive terminal, and the other corresponds to a second conductive terminal. All of the transistors in the following embodiments are of P-channel type, but the disclosure is not limited thereto. The transistors in the following embodiments are, for example, thin-film transistors, but the disclosure is not limited thereto. Moreover, the term "connection" in the present specification means "electrical connection" unless otherwise specified, and includes not only the case of meaning direct connection but also the case of meaning indirect connection via another element in the scope not deviating from the gist of the disclosure.

1. First Embodiment

<1.1 Overall Configuration>

Figure 1:
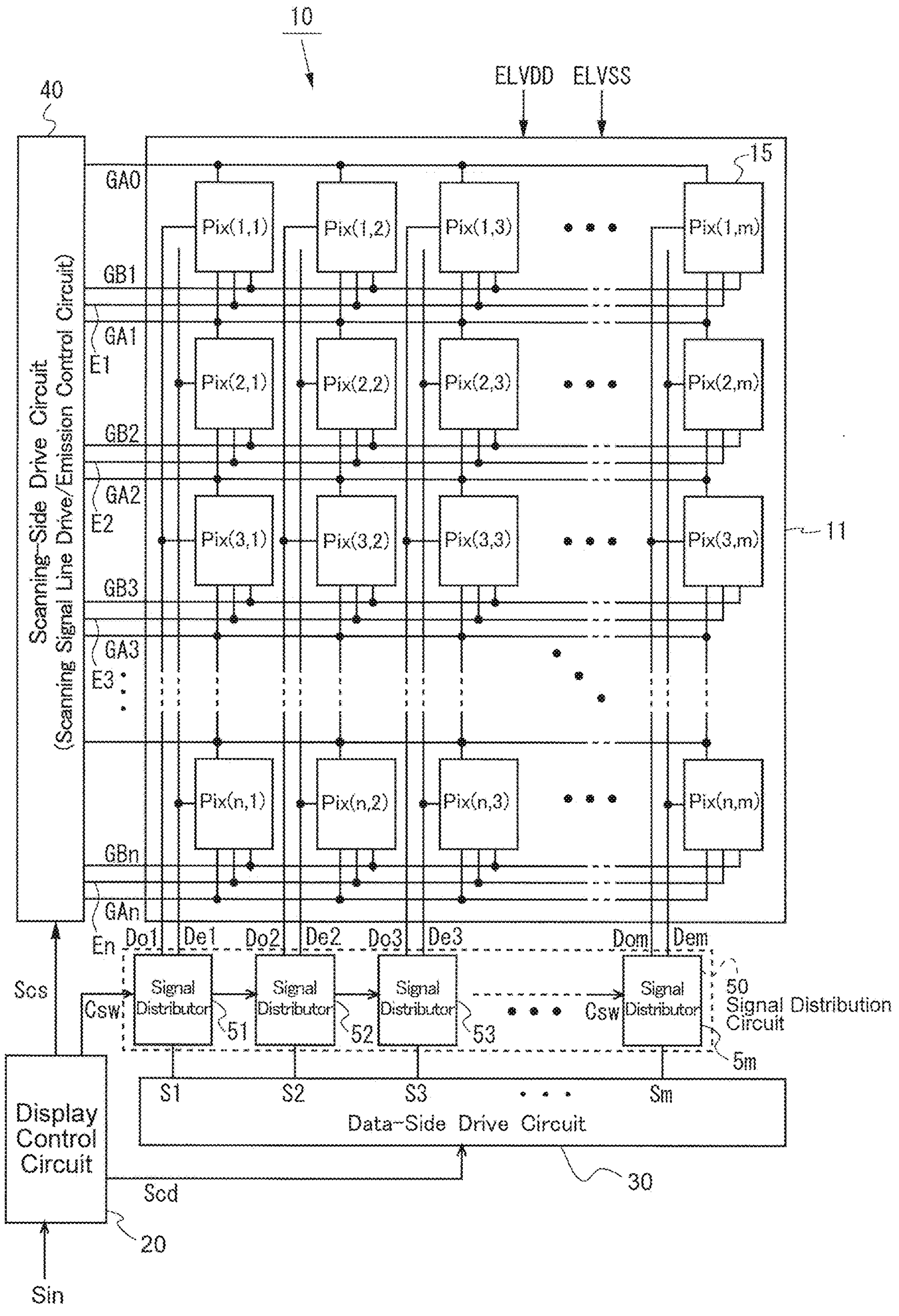
FIG. 1 is a block diagram illustrating an overall configuration of a display device according to a first embodiment.

FIG. 1 is a block diagram illustrating an overall configuration of an organic EL display device 10 according to a first embodiment. The display device 10 is an organic EL display device of an internal compensation system. That is, each pixel circuit 15 in the display device 10 has a function of compensating for variations and shifts in a threshold voltage of an internal drive transistor (details will be described later).

As illustrated in FIG. 1, the display device 10 includes a display portion 11, a display control circuit 20, a data-side drive circuit 30, a scanning-side drive circuit 40, and a signal distribution circuit 50, and the signal distribution circuit 50 includes m signal distributors 51 to 5*m*. The data-side drive circuit 30 functions as a data signal line drive circuit (also referred to as a "data signal line drive circuit" or a "data driver") that drives data signal lines Doj, Dej via the signal distributor 5*j* (j=1 to m). The scanning-side drive circuit 40 functions as a scanning signal line drive circuit (also referred to as a "gate driver") and an emission control circuit (also referred to as an "emission driver"). In the configuration illustrated in FIG. 1, the two drive circuits have been implemented as one scanning-side drive circuit 40, but the two drive circuits may be appropriately separated, and further, the two drive circuits may be separated and disposed on one side and the other side of the display portion 11. At least a part of each of the scanning-side drive circuit 40 and the data-side drive circuit 30 may be integrally formed with the display portion 11. In the present embodiment, the signal distributors 51 to 5*m* are formed integrally with the display portion 11, but may be configured separately from the display portion 11 and mounted on a panel as the display portion 11. These points also apply to other embodiments and modifications to be described later. Note that the display device 10 includes a power supply circuit (not illustrated) in addition to the above, and the power supply circuit generates a high-level power supply voltage ELVDD, a low-level power supply voltage ELVSS, and an initialization voltage Vini, described later, to be supplied to the display portion 11, and a power supply voltage (not illustrated) to be supplied to each of the display control circuit 20, the data-side drive circuit 30, and the scanning-side drive circuit 40.

In the display portion 11, 2m (m is an integer of 2 or more) data signal lines Do1, De1, Do2, De2, . . . , Dom, Dem, and n+1 (n is an integer of 2 or more) reset scanning signal lines (hereinafter also referred to simply as "reset signal lines") GA0 to GAn and n writing control scanning signal lines (hereinafter also referred to simply as "scanning signal lines") GB1 to GBn, which intersect the 2m data signal lines, are disposed, and n emission control lines (also referred to as "emission lines") E1 to En are disposed along n scanning signal lines GB1 to GBn, respectively. The above 2m data signal lines Do1, De1, Do2, De2, . . . , Dom, Dem are grouped into m data signal line groups (Do1, De1) to (Dom, Dem) with two adjacent data signal lines Doj, Dej as one group, which are connected to m signal distributors 51 to 5*m*, respectively. That is, each signal distributor 5*j* (j=1 to m) has two output terminals made up of first and second output terminals and one input terminal, and the two data signal lines Doj, Dej constituting one data signal line group (Doj, Dej) corresponding to the signal distributor 5*j* are connected to the first and second output terminals, respectively. An input terminal of each signal distributor 5*j* is connected to the data-side drive circuit 30, and a data signal Sj is provided to the input terminal from the data-side drive circuit 30 (j=1 to m).

As illustrated in FIG. 1, the display portion 11 is provided with m×n pixel circuits 15. The m×n pixel circuits 15 are arranged in a matrix along the m data signal line groups (Do1, De1) to (Dom, Dem) and the n scanning signal lines GB1 to GBn, and each pixel circuit 15 corresponds to any one of the m data signal line groups (Do1, De1) to (Dom, Dem) and corresponds to any one of the n scanning signal lines GB1 to GBn (hereinafter, in the case of distinguishing each pixel circuit 15, a pixel circuit corresponding to the ith scanning signal line GBi and the jth data signal line group (Doj, Dej) is referred to as "a pixel circuit in the ith row and the jth column" and denoted by reference sign "Pix(i, j)"). The n emission control lines E1 to En correspond to the n scanning signal lines GB1 to GBn, respectively. Therefore, each pixel circuit 15 also corresponds to any one of the n emission control lines E1 to En.

A power line (not illustrated) common to each pixel circuit 15 is disposed in the display portion 11. That is, there are provided a power line configured to supply a high-level power supply voltage ELVDD for driving an organic EL element to be described later (hereinafter, the line will be referred to as a "high-level power line" and denoted by the same reference sign "ELVDD" as the high-level power supply voltage) and a power line configured to supply a low-level power supply voltage ELVSS for driving the organic EL element (hereinafter, the line will be referred to as a "low-level power line" and denoted by the same reference sign "ELVSS" as the low-level power supply voltage). Further, an initialization voltage supply line (not illustrated) for supplying an initialization voltage Vini to be used in a reset operation (also referred to as an "initialization operation") for initializing each pixel circuit 15 (the line is denoted by the same reference sign "Vini" as the initialization voltage) is also disposed in the display portion 11. The high-level power supply voltage ELVDD, the low-level power supply voltage ELVSS, and the initialization voltage Vini are supplied from a power supply circuit (not illustrated).

The display control circuit 20 receives an input signal Sin including image information representing an image to be displayed and timing control information for image display from the outside of the display device 10, generates a data-side control signal Scd, a scanning-side control signal Scs, and a data signal line switching control signal Csw on the basis of the input signal Sin, and provides the data-side control signal Scd to the data-side drive circuit 30 and the scanning-side control signal Scs to the scanning-side drive circuit (scanning signal line drive/emission control circuit) 40, and provides the data signal line switching control signal Csw to each signal distributor 5*j* (j=1 to m).

On the basis of the data-side control signal Scd from the display control circuit 20, the data-side drive circuit 30 outputs m data signals S1 to Sm representing images to be displayed and respectively provides the m data signals S1 to Sm to the m signal distributors 51 to 5*m* in the signal distribution circuit 50. Each signal distributor 5*j* distributes the data signal Sj provided thereto to two data signal lines Doj, Dej connected thereto (details will be described later). In this manner, the data signal lines Do1, De1 to Dom, Dem in the display portion 11 are driven by the data-side drive circuit 30 via the signal distributors 51 to 5*m*.

The scanning-side drive circuit 40 functions as the scanning signal line drive circuit that drives the reset signal lines (reset scanning signal lines) GA0 to GAn and the scanning signal lines (writing control scanning signal lines) GB1 to GBn on the basis of the scanning-side control signal Scs from the display control circuit 20, and an emission control circuit that drives the emission control lines E1 to En.

More specifically, as the scanning signal line drive circuit, the scanning-side drive circuit 40 sequentially selects the reset signal lines GA0 to GAn for two horizontal periods each with an overlap of one horizontal period in each frame period on the basis of the scanning-side control signal Scs, applies an active signal (low-level voltage) to the selected reset signal line GAk, and applies an inactive signal (high-level voltage) to the unselected reset signal line. Further, the scanning-side drive circuit 40 sequentially selects the scanning signal lines GB1 to GBn for two horizontal periods each with one horizontal period overlapped with each other in each frame period, applies an active signal (low-level voltage) to the selected scanning signal line GBk, and applies an inactive signal (high-level voltage) to the unselected scanning signal line, on the basis of the scanning-side control signal Scs, together with the driving of the reset signal lines GA0 to GAn. Thus, m pixel circuits Pix(k, 1) to Pix(k, m) corresponding to the selected scanning signal lines GBk ($1 \le k \le n$) are selected collectively. As a result, in the selection period of the scanning signal line GBk (hereinafter referred to as an "kth horizontal period"), the voltages (hereinafter, these voltages may be simply referred to as "data voltages" without distinction) of the data signals respectively applied from the data-side drive circuit 30 to the data signal lines Do1, De1 to Dom, Dem via the signal distributors 51 to 5*m* are written as pixel data into the pixel circuits Pix(k, 1) to Pix(k, m) (details will be described later with reference to FIG. 4).

Figure 4:
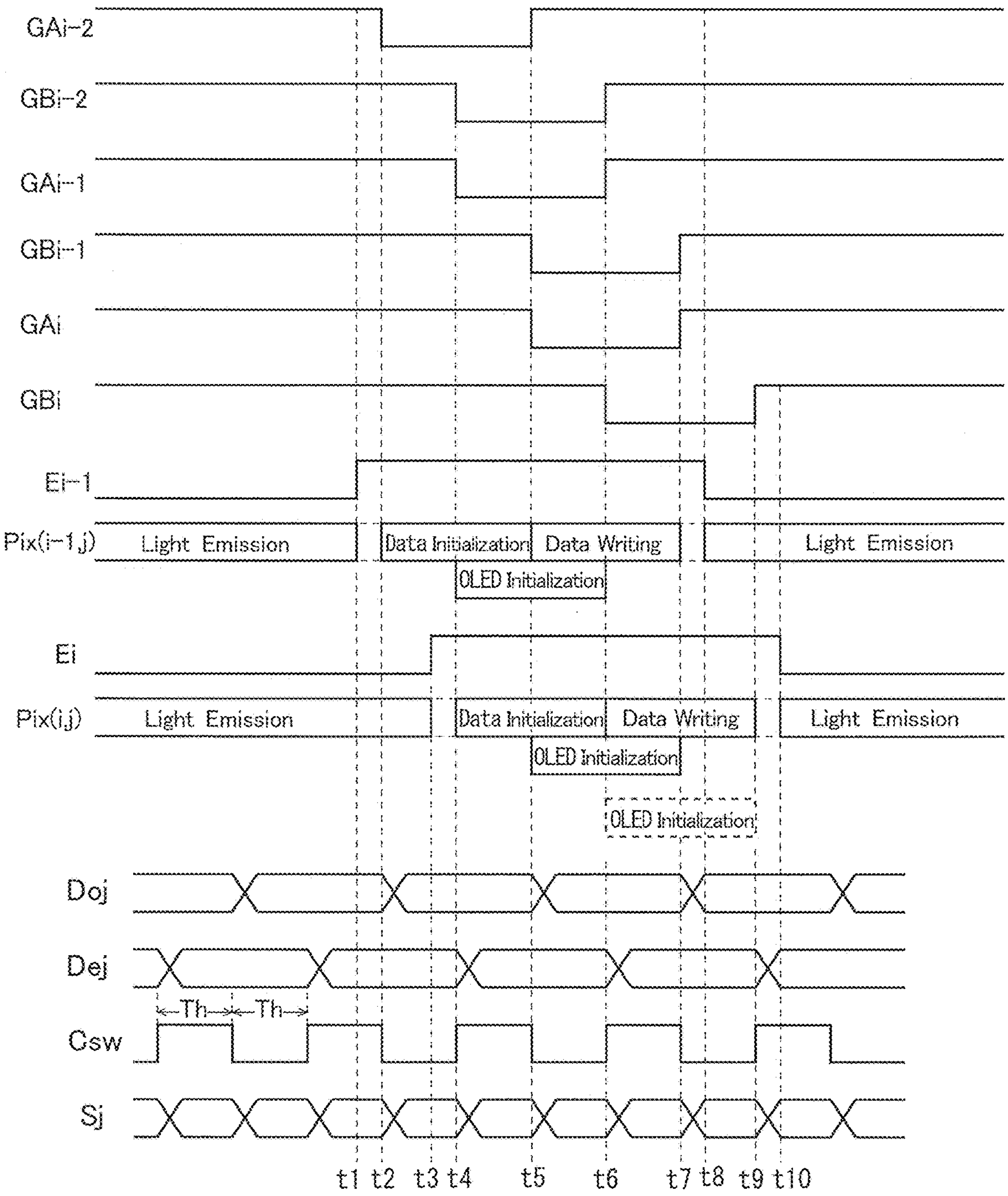
FIG. 4 is a timing chart of drive signals in the display device according to the first embodiment.

As the emission control circuit, the scanning-side drive circuit 40 applies an emission control signal (high-level voltage) indicating non-emission to the ith emission control line Ei for a predetermined period including the ith horizontal period (in the present embodiment, the (i−2)th horizontal period to the (i+1)th horizontal period) on the basis of the scanning-side control signal Scs, and applies an emission control signal (low-level voltage) indicating emission in other periods (see FIG. 4 to be described later). While the voltage of the emission control line Ei is at a low level, the organic EL elements in the pixel circuits Pix(i, 1) to Pix(i, m) corresponding to the ith scanning signal line GBi (hereinafter also referred to as "pixel circuits in the ith row") emit light with a luminance corresponding to the data voltages written respectively in the pixel circuits Pix(i, 1) to Pix(i, m) in the ith row.

<1.2 Configuration and Operation of Pixel Circuit>

Next, configurations of the pixel circuit 15 and the signal distributor 5*j* (j=1 to m) according to the present embodiment, and various signals (hereinafter also referred to collectively as a "drive signal") GA0 to Gn, GB1 to GBn, E1 to En, Do1 to Dom, and De1 to Dem for driving the pixel circuit 15 will be described with reference to FIGS. 2 to 4.

Figure 2:
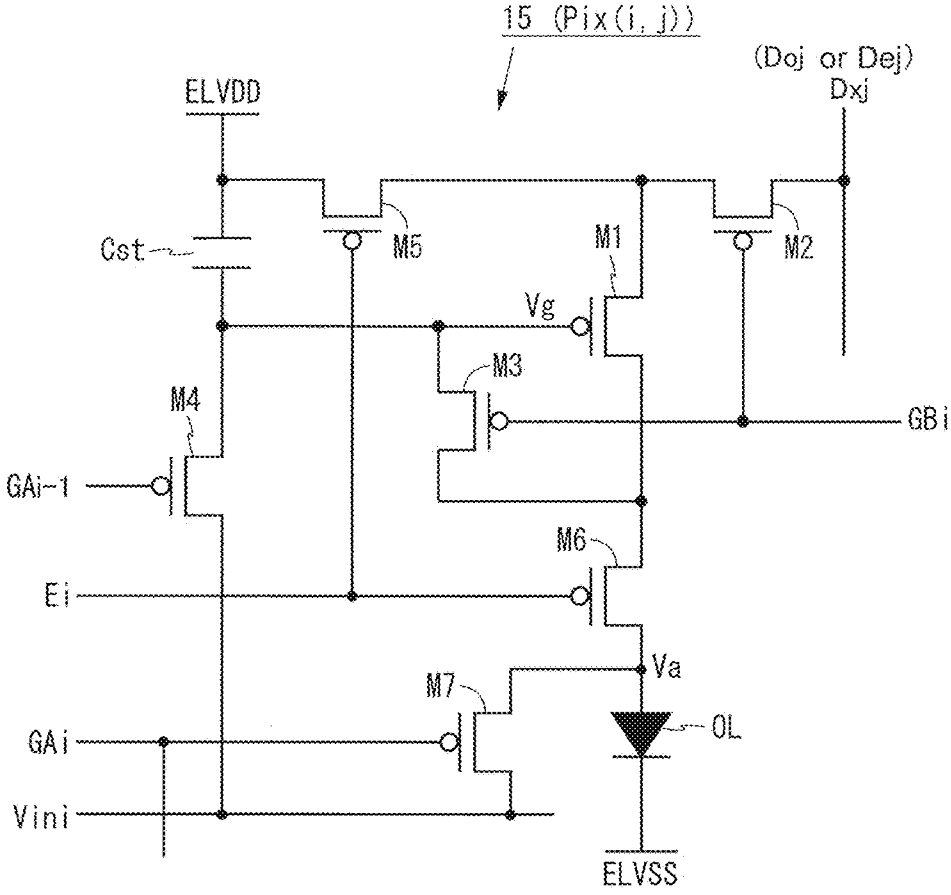
FIG. 2 is a circuit diagram illustrating a configuration of a pixel circuit in the first embodiment.

FIG. 2 is a circuit diagram illustrating the configuration of the pixel circuit 15 in the present embodiment. As illustrated in FIG. 2, the pixel circuit 15 includes an organic EL element OL as a display element, a drive transistor M1, a writing control transistor M2, a threshold compensation transistor M3, a first initialization transistor M4, a first emission control transistor M5, a second emission control transistor M6, a second initialization transistor M7, and a holding capacitor Cst. In the pixel circuit 15, the transistors M2 to M7 except for the drive transistor M1 function as switching elements.

As illustrated in FIG. 2, the pixel circuit 15 is connected with a scanning signal line (hereinafter also referred to as a "corresponding scanning signal line" in the description focusing on the pixel circuit) GBi corresponding to the pixel circuit 15, a reset signal line (hereinafter also referred to as a "corresponding reset signal line" in the description focusing on the pixel circuit) GAi corresponding to the pixel circuit 15, a reset signal line (a reset signal line immediately before in the scanning order of the reset signal lines GA0 to GAn, hereinafter also referred to as a "preceding reset signal line" in the description focusing on the pixel circuit) GAi−1 immediately before the corresponding reset signal line GAi, an emission control line (hereinafter also referred to as a "corresponding emission control line" in the description focusing on the pixel circuit) Ei corresponding to the pixel circuit 15, any one data signal line (hereinafter also referred to as a "corresponding data signal line" in the description focusing on the pixel circuit) Doj or Dej in a the data signal line group (Doj, Dej) corresponding to the pixel circuit 15, an initialization voltage supply line Vini, a high-level power line ELVDD, and a low-level power line ELVSS. Here, when the scanning signal line GBi corresponding to the pixel circuit 15 is an odd-numbered scanning signal line, that is, when the pixel circuit 15 is an odd-numbered pixel circuit Pix(i, j) (i is an odd number) in n pixel circuits (hereinafter also referred to as a "jth pixel circuit column") Pix(1, j) to Pix(n, j) corresponding to the jth data signal line group (Doj, Dej), which is a corresponding group, one data signal line (hereinafter referred to as an "odd-numbered row data signal line") Doj included in the jth data signal line group (Doj, Dej) is connected to the pixel circuit 15. On the other hand, when the scanning signal line GBi corresponding to the pixel circuit 15 is an even-numbered scanning signal line, that is, when the pixel circuit 15 is an even-numbered pixel circuit Pix(i, j) (i is an even number) in the jth pixel circuit columns Pix(1, j) to Pix(n, j) corresponding to the jth data signal line group (Doj, Dej), which is the corresponding group, another data signal line (hereinafter referred to as an "even-numbered row data signal line") Dej included in the jth data signal line group (Doj, Dej) is connected to the pixel circuit 15 (see FIG. 1). In the following description focusing on the pixel circuit 15, when it is not necessary to distinguish whether the corresponding data signal line connected to the pixel circuit 15 is the odd-numbered row data signal line Doj or the even-numbered row data signal line Dej, the corresponding data signal line is indicated by reference sign "Dxj".

As illustrated in FIG. 2, in the pixel circuit 15, the source terminal as the first conductive terminal of the drive transistor M1 is connected to the corresponding data signal line Dxj via the writing control transistor M2 and is connected to the high-level power line ELVDD via the first emission control transistor M5. The drain terminal as the second conductive terminal of the drive transistor M1 is connected to an anode electrode of the organic EL element OL via the second emission control transistor M6. The gate terminal as the control terminal of the drive transistor M1 is connected to the high-level power line ELVDD via the holding capacitor Cst, is connected to the drain terminal of the drive transistor M1 via the threshold compensation transistor M3 and is connected to the initialization voltage supply line Vini via the first initialization transistor M4. The anode electrode of the organic EL element OL is connected to the initialization voltage supply line Vini via the second initialization transistor M7, and the cathode electrode of the organic EL element OL is connected to the low-level power line ELVSS. The gate terminals of the writing control transistor M2 and the threshold compensation transistor M3 are connected to the corresponding scanning signal line GBi, the gate terminal of the first initialization transistor M4 is connected to the preceding reset signal line GAi−1, the gate terminal of the second initialization transistor M7 is connected to the corresponding reset signal line GAi, and the gate terminals of the first and second emission control transistors M5, M6 are connected to the corresponding emission control line Ei.

The drive transistor M1 operates in a saturation region, and a drive current Id flowing through the organic EL element OL in the emission period is given by Equation (1) below: A gain β of the drive transistor M1 included in Equation (1) is given by Equation (2) below.

$$Id = (\beta/2)(|Vgs| - |Vth|)^2 = (\beta/2)(|Vg - ELVDD| - |Vth|)^2 \quad (1)$$

$$\beta = \mu \times (W/L) \times Cox \quad (2)$$

In Equations (1) and (2) above, Vg, Vgs, Vth, μ, W, L, and Cox represent the voltage of the gate terminal (hereinafter referred to as a "gate voltage"), the gate-source voltage, the threshold voltage, the mobility, the gate width, the gate length, and the gate insulating film capacitance per unit area in the drive transistor M1, respectively.

Figure 3:
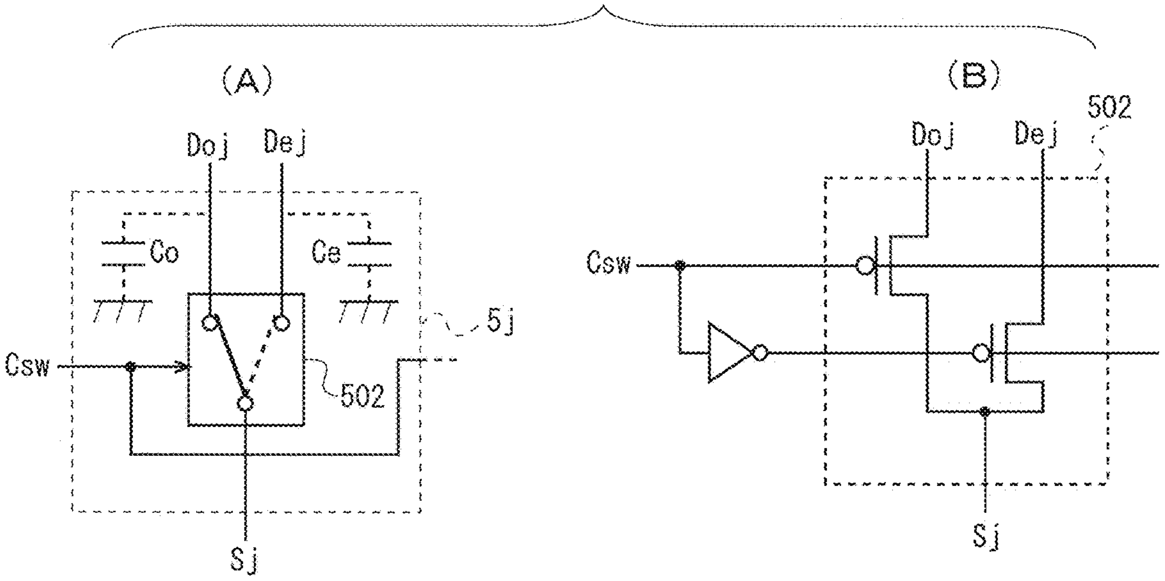
FIG. 3 is a circuit diagram illustrating a configuration example of a signal distributor in the first embodiment.

(A) of FIG. 3 is a circuit diagram illustrating the configuration of the signal distributor 5*j*, that is, the jth signal distributor 5*j* to which the jth data signal Sj among the data signals S1 to Sm output from the data-side drive circuit 30 is input in the present embodiment (j=1 to m). The signal distributor 5*j* includes a changeover switch 502 and is implemented, for example, by connecting two P-channel thin-film transistors as switching elements as illustrated in (B) of FIG. 3. The jth data signal line group, that is, the odd-numbered row data signal line Doj and the even-numbered row data signal line Dej, which is the corresponding group, is connected to the changeover switch 502, and a data signal line switching control signal (hereinafter, it is also simply referred to as a "switching control signal") Csw is provided from the display control circuit 20 to the changeover switch. As illustrated in FIG. 4 to be described later, the switching control signal Csw is a signal with its level alternating between a high level (H level) and a low level (L level) every one horizontal period Th. The changeover switch 502 connects the output terminal for outputting the jth data signal Sj in the data-side drive circuit 30 to the odd-numbered row data signal line Doj when the switching control signal Csw is at L level, and connects the output terminal for outputting the jth data signal Sj in the data-side drive circuit 30 to the even-numbered row data signal line Dej when the switching control signal Csw is at H level. The switching control signal Csw is at L level when (the voltages of) the data signals S1 to Sm are to be respectively written into the m pixel circuits corresponding to the odd-numbered scanning signal lines GBio, that is, the pixel circuits Pix(io, 1) to Pix(io, m) (io is an odd number) in the odd-numbered rows, and the switching control signal Csw is at H level when (the voltages of) the data signals S1 to Sm are to be respectively written into the m pixel circuits corresponding to the even-numbered scanning signal lines GBie, that is, the pixel circuits Pix(ie, 1) to Pix(ie, m) (ie is an even number) in the even-numbered rows (details will be described later).

Note that the voltage of the data signal Sj provided from the data-side drive circuit 30 to the corresponding data signal line Dxj via the signal distributor 5*j* is held by the wiring capacitance of the corresponding data signal line Dxj even after the corresponding data signal line Dxj is electrically disconnected from the output terminal of the data-side drive circuit 30. Capacitances Co, Ce connected to the corresponding odd-numbered row data signal line Doj and even-numbered row data signal line Dej, respectively, may be provided in the signal distributor 5*j* so as to more reliably hold the voltage (see (A) of FIG. 3).

FIG. 4 is a timing chart of drive signals for driving the pixel circuits Pix(i−1, j), Pix(i, j). In FIG. 4, a period from time t1 to time t8 is a non-emission period for the pixel circuits Pix(i−1, 1) to Pix(i−1, m) in the (i−1)th row. A period from time t2 to time t5 is the selection period of the (i−2)th reset signal line GAi−2 and corresponds to a data initialization period (an initialization period of a gate voltage Vg) for initializing the holding voltage of the holding capacitor Cst in the pixel circuit Pix(i−1, j). A period from time t4 to time t6 is the selection period of the (i−1)th reset signal line GAi−1 and corresponds to an organic EL element (OLED) initialization period for releasing the accumulated charge in the parasitic capacitance of the OLED in the pixel circuit Pix(i−1, j) (this period coincides with the selection period of the (i−2)th scanning signal line GBi−2). A period from time t5 to time t7 is the selection period of the (i−1)th scanning signal line GBi−1 and corresponds to a data writing period for writing a data voltage to the holding capacitor Cst in the pixel circuit Pix(i−1, j).

In the pixel circuit Pix(i−1, j) in the (i−1)th row and the jth column, as illustrated in FIG. 4, when the voltage of the (i−1)th emission control line Ei-1 changes from L level to H level at time t1, the first and second emission control transistors M5, M6 change from an on-state to an off-state, and the organic EL element OL comes into a non-emission-state.

At time t2, when the voltage of the (i−2)th reset signal line GAi-2 changes from H level to L level, the first initialization transistor M4 changes to the on-state. Thus, the initialization voltage Vini is provided to the second terminal of the holding capacitor Cst in which the high-level power supply voltage ELVDD is provided to the first terminal, whereby the holding voltage of the holding capacitor Cst is initialized, and the voltage of the gate terminal of the drive transistor M1, that is, the gate voltage Vg is initialized to the initialization voltage Vini. The initialization voltage Vini is such a voltage that the drive transistor M1 can be maintained in the on-state at the time of writing the data voltage to the pixel circuit 15.

When the voltage of the (i−2)th reset signal line GAi-2 changes to H level at time t5, the first initialization transistor M4 changes to the off-state in the pixel circuit Pix(i−1, j) in the (i−1)th row and the jth column. At time t5, the (i−1)th scanning signal line GBi−1 changes from H level to L level, whereby the writing control transistor M2 changes to the on-state, and the data writing period in the pixel circuit Pix(i−1, j) in the (i−1)th row and the jth column starts. During a period from time t5 to the start time point t6 of the selection period of the ith scanning signal line GBi, that is, the start time point t6 of the data writing period of the pixel circuit Pix(i, j) in the ith row and the jth column, the data-side drive circuit 30 outputs data voltages d(i−1, 1) to d(i−1, m) to be provided to the pixel circuits Pix(i−1, 1) to Pix(i−1, m) ((i−1) is an odd number) in the odd-numbered rows as data signals S1 to Sm. In a period from time t5 to time t6, the switching control signal Csw is at L level, and the data signals S1 to Sm are applied to the odd-numbered row data signal lines Do1 to Dom via the signal distributors 51 to 5*m*, respectively (see FIGS. 1, 3, and 4). From time t6 to the end time point t7 of the selection period of the scanning signal line GBi−1 (time point t7 at which the (i−1)th scanning signal line GBi−1 changes to H level), the switching control signal Csw is at H level, and the odd-numbered row data signal lines Do1 to Dom are electrically disconnected from the data-side drive circuit 30, but the voltages of the data signals S1 to Sm applied in the period from t5 to t6 are held in the odd-numbered row data signal lines Do1 to Dom, respectively, also in the period from t6 to t7 due to the wiring capacitances thereof. Therefore, the voltages of the data signals S1 to Sm applied in the period from t5 to t6 are respectively provided as the data voltages d(i−1, 1) to d(i−1, m) to the pixel circuits Pix(i−1, 1) to Pix(i−1, m) in the (i−1)th row, which is the odd-numbered row, from the odd-numbered row data signal lines Do1 to Dom, during the selection period from t5 to t7 of the (i−1)th scanning signal line GBi−1.

Here, focusing on the pixel circuit Pix(i−1, j) in the (i−1)th row and the jth column, the data voltage provided from the odd-numbered row data signal line Doj to the pixel circuit Pix(i−1, j) in the data writing period, that is, in the selection period from t5 to t7 of the (i−1)th scanning signal line GBi−1, is set as Vdata=d(i−1, j). In the data writing period from t5 to t7, not only the writing control transistor M2 but also the threshold compensation transistor M3 is in the on-state, and accordingly, the drive transistor M1 is in a state where the gate terminal and the drain terminal thereof are connected, that is, in a diode-connected state. As a result, the voltage of the corresponding data signal line Doj, that is, a data voltage Vdata, is provided to the holding capacitor Cst via the drive transistor M1 in the diode-connected state. Thereby, the gate voltage Vg changes toward a value given by Equation (3) below.

$$Vg = V\text{data} - |V\text{th}| \quad (3)$$

At time t4 before the start of the data writing period from t5 to t7 of the pixel circuit Pix(i−1, j) in the (i−1)th row and the jth column as described above, the (i−1)th reset signal line GAi−1 changing from H level to L level, so that the second initialization transistor M7 changes to the on-state. Thereby, the accumulated charge in the parasitic capacitance of the organic EL element OL is released, and the anode voltage Va of the organic EL element OL is initialized to the initialization voltage Vini (see FIG. 2). The (i−1)th reset signal line GAi−1 changes to H level at time t6 before the end of the data writing period from t5 to t7, whereby the second initialization transistor M7 changes to the off-state. Therefore, as illustrated in FIG. 4, the period t4 to t6 is the OLED initialization period of the pixel circuit Pix(i−1, j) in the (i−1)th row and the jth column.

At time t8 after the end of the data writing period from t5 to t7, the voltage of the (i−1)th emission control line Ei−1 changes to L level, and accordingly, the first and second emission control transistors M5, M6 change to the on-state. Therefore, after time t8, the current Id flows from the high-level power line ELVDD to the low-level power line ELVSS via the first emission control transistor M5, the drive transistor M1, the second emission control transistor M6, and the organic EL element OL. The current Id is given by Equation (1) above. Considering that the drive transistor M1 is of the P-channel type and ELVDD>Vg, the current Id is given by the following equation from Equations (1) and (3) above.

$$Id = (\beta/2)(ELVDD - \mathrm{Vg} - |\mathrm{V}th|)^2 = (\beta/2)(ELVDD - \mathrm{Vdata})^2 \quad (4)$$

From the above, after time t8, the organic EL element OL emits light with a luminance corresponding to the data voltage Vdata that is the voltage of the corresponding data signal line Doj in the selection period of the (i−1)th scanning signal line GBi−1 regardless of the threshold voltage Vth of the drive transistor M1.

Next, a drive signal for driving the pixel circuit Pix(i, j) in the ith row and the jth column will be described with reference to FIG. 4. In FIG. 4, a period from time t3 to time t10 is a non-emission period for the pixel circuits Pix(i, 1) to Pix(i, m) in the ith row. A period from time t4 to time t6 is the selection period of the (i−1)th reset signal line GAi−1 and corresponds to a data initialization period (the initialization period of the gate voltage Vg) for initializing the holding voltage of the holding capacitor Cst in the pixel circuit Pix(i, j). A period from time t5 to time t7 is the selection period of the ith reset signal line GAi and corresponds to an OLED initialization period for releasing the accumulated charge in the parasitic capacitance of the organic EL element (OLED) in the pixel circuit Pix(i, j) (this period coincides with the selection period of the (i−1)th scanning signal line GBi−1). A period from time t6 to time t9 is the selection period of the ith scanning signal line GBi and corresponds to a data writing period for writing a data voltage to the holding capacitor Cst in the pixel circuit Pix(i, j).

In the pixel circuit Pix(i, j) in the ith row and the jth column, when the voltage of the ith emission control line Ei changes from the low level to the high level at time t3 as illustrated in FIG. 4, the first and second emission control transistors M5, M6 change from the on-state to the off-state, and the organic EL element OL comes into a non-emission state.

At time t4, when the voltage of the (i−1)th reset signal line GAi−1 changes from H level to L level, the first initialization transistor M4 changes to the on-state. Thereby, similarly to the pixel circuit Pix(i−1, j) in the (i−1)th row and the jth column, in the pixel circuit Pix(i, j) in the ith row and the jth column, the holding voltage of the holding capacitor Cst is initialized by the initialization voltage Vini, and the gate voltage Vg of the drive transistor M1 is initialized to the initialization voltage Vini.

At time t6, when the voltage of the (i−1)th reset signal line GAi−1 changes to H level, the first initialization transistor M4 changes to the off-state. Further, at time t6, the ith scanning signal line GBi changes from H level to L level, whereby the writing control transistor M2 changes to the on-state in the pixel circuit Pix(i, j) in the ith row and the jth column, and the data writing period starts. During a period from time t6 to the start time point t7 of the selection period of the (i+1)th scanning signal line GBi+1, that is, the data writing period of the pixel circuit Pix(i+1, j) in the (i+1)th row and the jth column, the data-side drive circuit 30 outputs data voltages d(i, 1) to d(i, m) to be provided to the pixel circuits Pix(i, 1) to Pix(i, m) in the even-numbered row as data signals S1 to Sm. In a period from time t6 to time t7, the switching control signal Csw is at H level, and the data signals S1 to Sm are applied to the even-numbered row data signal lines De1 to Dem via the signal distributors 51 to 5*m*, respectively (see FIGS. 1, 3, and 4). From time t7 to the end time point t9 of the selection period of the scanning signal line GBi, the switching control signal Csw is at L level, and the even-numbered row data signal lines De1 to Dem are electrically disconnected from the data-side drive circuit 30, but the voltages of the data signals S1 to Sm applied in the period t6 to t7 are held in the even-numbered row data signal lines De1 to Dem, respectively, also in the period t7 to t9 due to the wiring capacitances thereof. Therefore, the voltages of the data signals S1 to Sm applied in the period t6 to t7 are respectively provided as the data voltages d(i, 1) to d(i, m) to the pixel circuits Pix(i, 1) to Pix(i, m) in the ith row, which is the even-numbered row, from the even-numbered row data signal lines De1 to Dem, during the selection period t6 to t9 of the ith scanning signal line GBi.

Here, focusing on the pixel circuit Pix(i, j) in the ith row and the jth column, the data voltage provided from the even-numbered row data signal line Dej to the pixel circuit Pix(i, j) in the data writing period, that is, the selection period t6 to t9 of the ith scanning signal line GBi, is set as Vdata=d(i, j). In the data writing period t6 to t9, not only the writing control transistor M2 but also the threshold compensation transistor M3 is in the on-state, and accordingly, the drive transistor M1 is in a diode-connected state. As a result, the voltage of the corresponding data signal line Dej, that is, the data voltage Vdata, is provided to the holding capacitor Cst via the drive transistor M1 in the diode-connected state. Thereby, the gate voltage Vg changes toward the value given by Equation (3) described above.

At time t5 before the start of the data writing period t6 to t9 of the pixel circuit Pix(i, j) in the ith row and the jth column as described above, the voltage of the ith reset signal line GAi changes from H level to L level, so that the second initialization transistor M7 changes to the on-state. Thereby, the accumulated charge in the parasitic capacitance of the organic EL element OL is released, and the anode voltage Va of the organic EL element OL is initialized to the initialization voltage Vini (see FIG. 2). The voltage of the ith reset signal line GAi changes to H level at time t7 before the end of the data writing period t6 to t9, whereby the second initialization transistor M7 changes to the off-state. Therefore, as illustrated in FIG. 4, the period from t5 to t7 is the OLED initialization period of the pixel circuit Pix(i, j) in the ith row and the jth column. In the pixel circuit Pix(i, j), instead of the ith reset signal line GAi, the ith scanning signal line GBi may be connected to the gate terminal of the second initialization transistor M7 to set the OLED initialization period as the period t6 to t9.

At time t10 after the end of the data writing period t6 to t9, the voltage of the ith emission control line Ei changes to L level, and accordingly, the first and second emission control transistors M5, M6 change to the on-state. Therefore, after time t10, the current Id flows from the high-level power line ELVDD to the low-level power line ELVSS via the first emission control transistor M5, the drive transistor M1, the second emission control transistor M6, and the organic EL element OL. The current Id is given by Equation (1) above. Considering that the drive transistor M1 is the P-channel type and ELVDD>Vg, from Equations (1) and (3) above, the current Id is given by Equation (4) described above and does not depend on the threshold voltage Vth of the drive transistor M1. Therefore, after time t10, in the pixel circuit Pix(i, j) in the ith row and the jth column, the organic EL element OL emits light with a luminance corresponding to the data voltage Vdata that is the voltage of the corresponding data signal line Dej in the selection period of the ith scanning signal line GBi regardless of the threshold voltage Vth of the drive transistor M1.

<1.3 Data Writing Operation and Problems Thereof in Known Example>

Before a writing operation (data writing operation) of a voltage of a data signal to the pixel circuit 15 in the present embodiment is described, a data writing operation to the pixel circuit 15 in a known organic EL display device (hereinafter referred to as a "known example") will be described below with reference to FIGS. 5 and 6 for comparison.

The overall configuration of the known example is basically similar to the configuration illustrated in FIG. 1 (the configuration of the display device according to the first embodiment) but differs from the configuration illustrated in FIG. 1 in the following points. That is, in the first embodiment, m data signal line groups (Do1, De1) to (Dom, Dem) with two adjacent data signal lines Doj, Dej as one group are arranged in the display portion 11, each pixel circuit 15 corresponds to two data signal lines Doj, Dej constituting one data signal line group (Doj, Dej) among the m data signal line groups (Do1, De1) to (Dom, Dem), and each data signal line group (Doj, Dej) is connected to the data-side drive circuit 30 via the signal distributor 5*j*. In contrast, in the known example, m data signal lines D1 to Dm are arranged in the display portion 11, one data signal line Dj among the m data signal lines D1 to Dm corresponds to each pixel circuit 15, and each data signal line Dj is directly connected to the data-side drive circuit 30 (not via the signal distributor).

Figure 5:
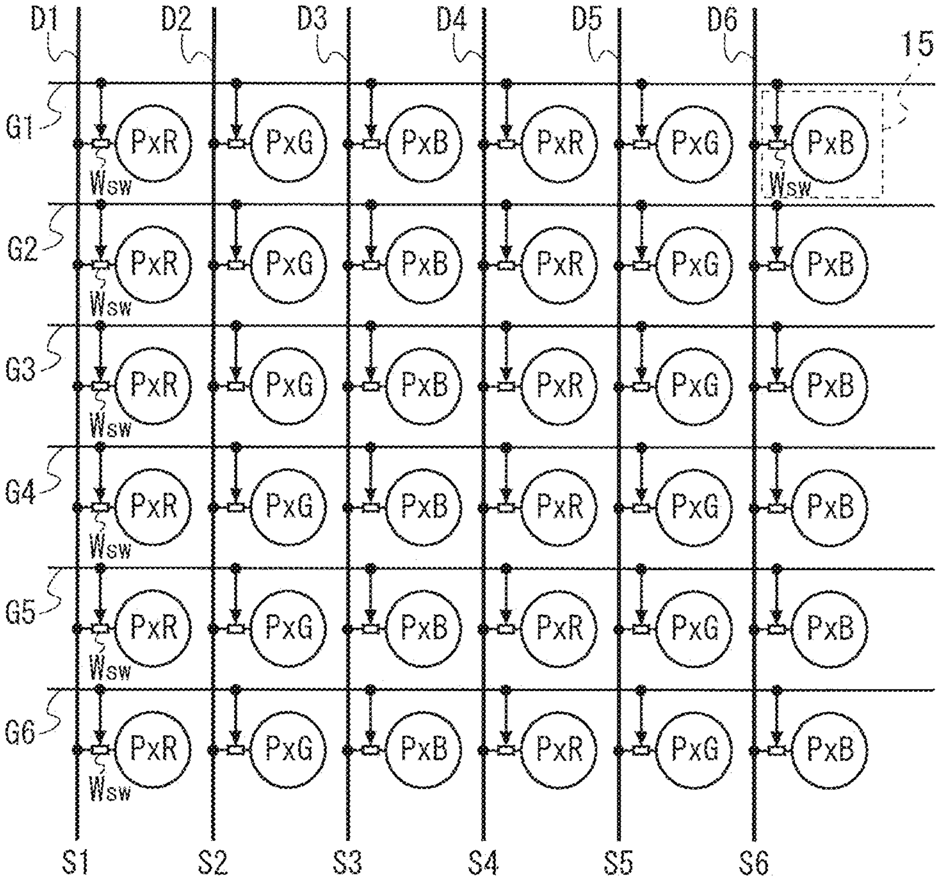
FIG. 5 is a diagram schematically illustrating an electrical configuration of a display portion in a known display device.

FIG. 5 is a diagram schematically illustrating the electrical configuration of the display portion of the known example as described above. In FIG. 5, for convenience of description, the number m of the data signal lines Dj and the number n of the scanning signal lines Gi are set to 6 (j=1 to 6, i=1 to 6), and each pixel circuit 15 includes one of the pixel parts PxR, PxG, PxB (hereinafter referred to as a "pixel part PxX") and the writing control switch Wsw. The writing control switch Wsw corresponds to the writing control transistor M2 in the pixel circuit 15 illustrated in FIG. 2, and the pixel part PxX corresponds to a portion except for the writing control transistor M2 in the pixel circuit 15 illustrated in FIG. 2. The same applies to FIGS. 7, 11, and 13 to be described later.

Figure 6:
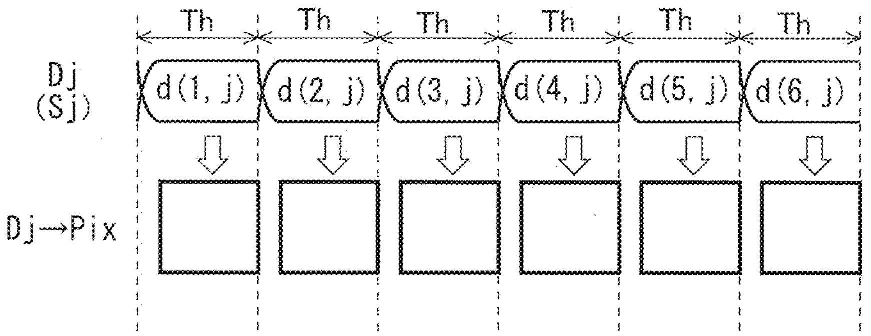
FIG. 6 is a timing chart for describing a writing operation of a data signal into a pixel circuit in the known display device.

FIG. 6 is a timing chart for describing a writing operation of a data signal into the pixel circuit in the known example including the display portion having the above configuration. As illustrated in FIG. 6, in the known example, the voltage of each data signal line Dj, that is, the voltage d(i, j) of each data signal Sj, is switched every one horizontal period Th, and accordingly, the period of data writing (Dj→Pix) from each data signal line Dj to the pixel circuit Pix(i, j) connected to the scanning signal line Gi in the selected state among the corresponding n pixel circuits (n=6) also becomes substantially one horizontal period Th. Therefore, for example, when the time that can be ensured for data writing is shortened due to an increase in the resolution of the display image, and the internal compensation system as illustrated in FIG. 2 has been adopted, the voltage (data voltage) of the data signal Si is provided to the holding capacitor Cst via the drive transistor M1, so that the holding capacitor Cst may not be sufficiently charged within the data writing period.

<1.4 Data Writing Operation in Present Embodiment>

Figure 7:
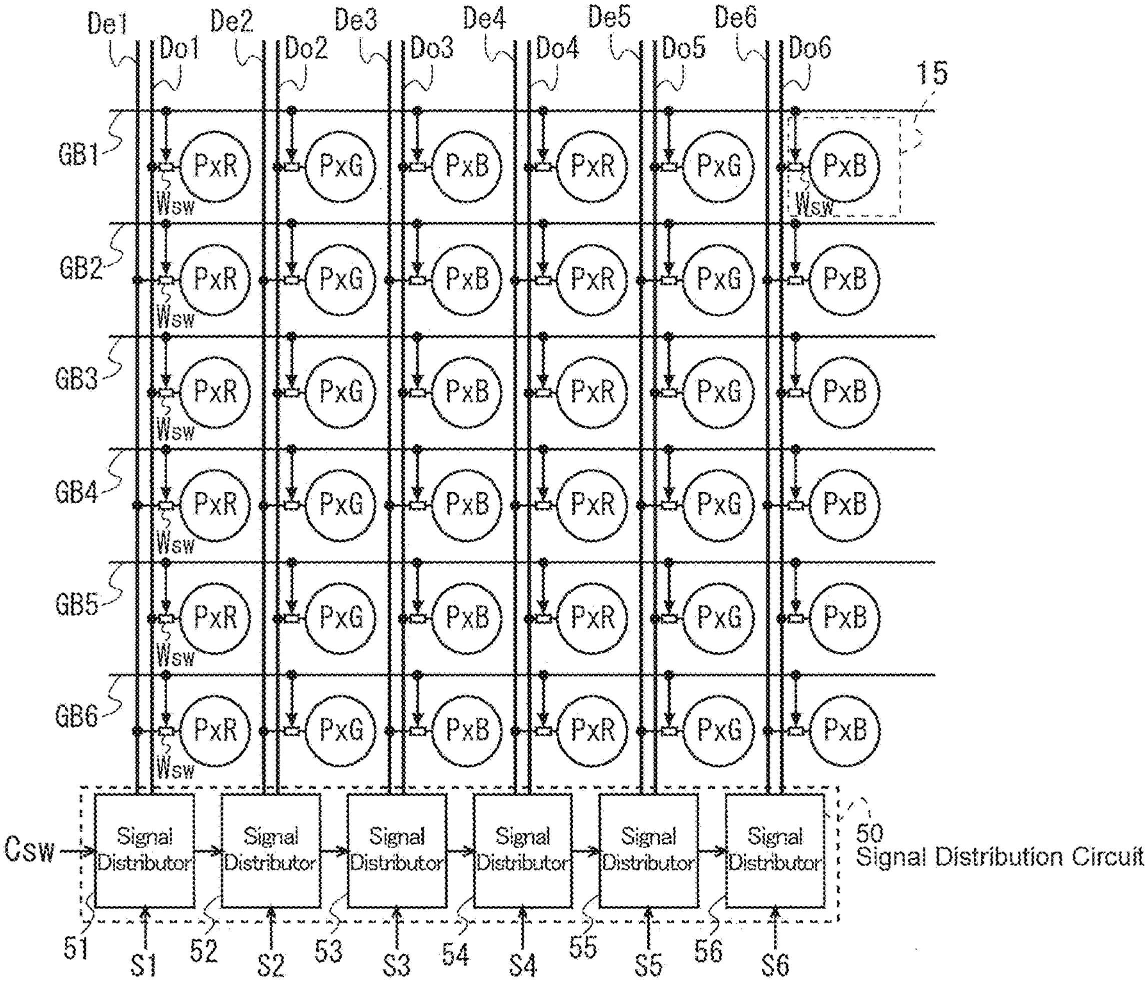
FIG. 7 is a diagram schematically illustrating an electrical configuration of a display portion in the first embodiment.
Figure 8:
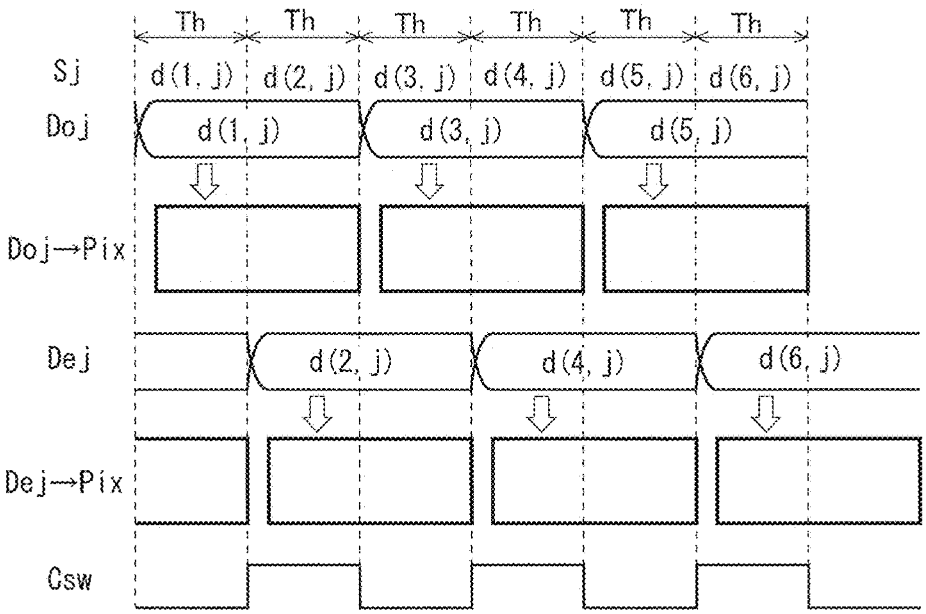
FIG. 8 is a timing chart for describing a writing operation of a data signal into a pixel circuit in the first embodiment.

FIG. 7 is a diagram schematically illustrating the electrical configuration of the display portion 11 according to the present embodiment. FIG. 8 is a timing chart for describing a writing operation of a data signal into the pixel circuit 15 according to the present embodiment.

In the present embodiment as well, similarly to the known example, the voltage d(i, j) of each data signal Sj is switched every one horizontal period Th. However, in the present embodiment, as illustrated in FIG. 7, two data signal lines made up of the odd-numbered row data signal line Doj and the even-numbered row data signal line Dej constituting one data signal line group correspond to each of the pixel circuit columns Pix(1, j) to Pix(6, j), and each data signal Sj is provided to the odd-numbered row data signal line Doj and the even-numbered row data signal line Dej via the signal distributor 5*j*. To each pixel circuit of the pixel circuit columns Pix(1, j) to Pix(6, j), the voltage of the data signal Sj is provided from one of the odd-numbered row data signal line Doj and the even-numbered row data signal line Dej (see FIG. 8). That is, in the odd-numbered pixel circuits Pix(io, j) in the pixel circuit columns Pix(1, j) to Pix(6, j), the voltage d(io, j) of the data signal Sj is provided to the pixel part PxX from the corresponding odd-numbered row data signal line Doj via the writing control switch Wsw in response to the driving of the scanning signal line GBio for approximately two horizontal periods (io is an odd number). On the other hand, in the even-numbered pixel circuits Pix(ie, j) in the pixel circuit columns Pix(1, j) to Pix(6, j), the voltage d(ie, j) of the data signal Sj is provided to the pixel part PxX from the corresponding even-numbered row data signal line Dej via the writing control switch Wsw in response to the driving of the scanning signal line GBie for approximately two horizontal periods at a timing shifted by one horizontal period from the voltage d(io, j) of the odd-numbered row data signal line Doj (ie is an even number).

As can be seen from a comparison of FIG. 8 with FIG. 6 illustrating the data writing of the known example, in the present embodiment, a period during which the voltage d(i, j) of the corresponding data signal line is provided to each pixel circuit Pix(i, j) for writing the data voltage is approximately doubled compared to the known example.

Figure 9:
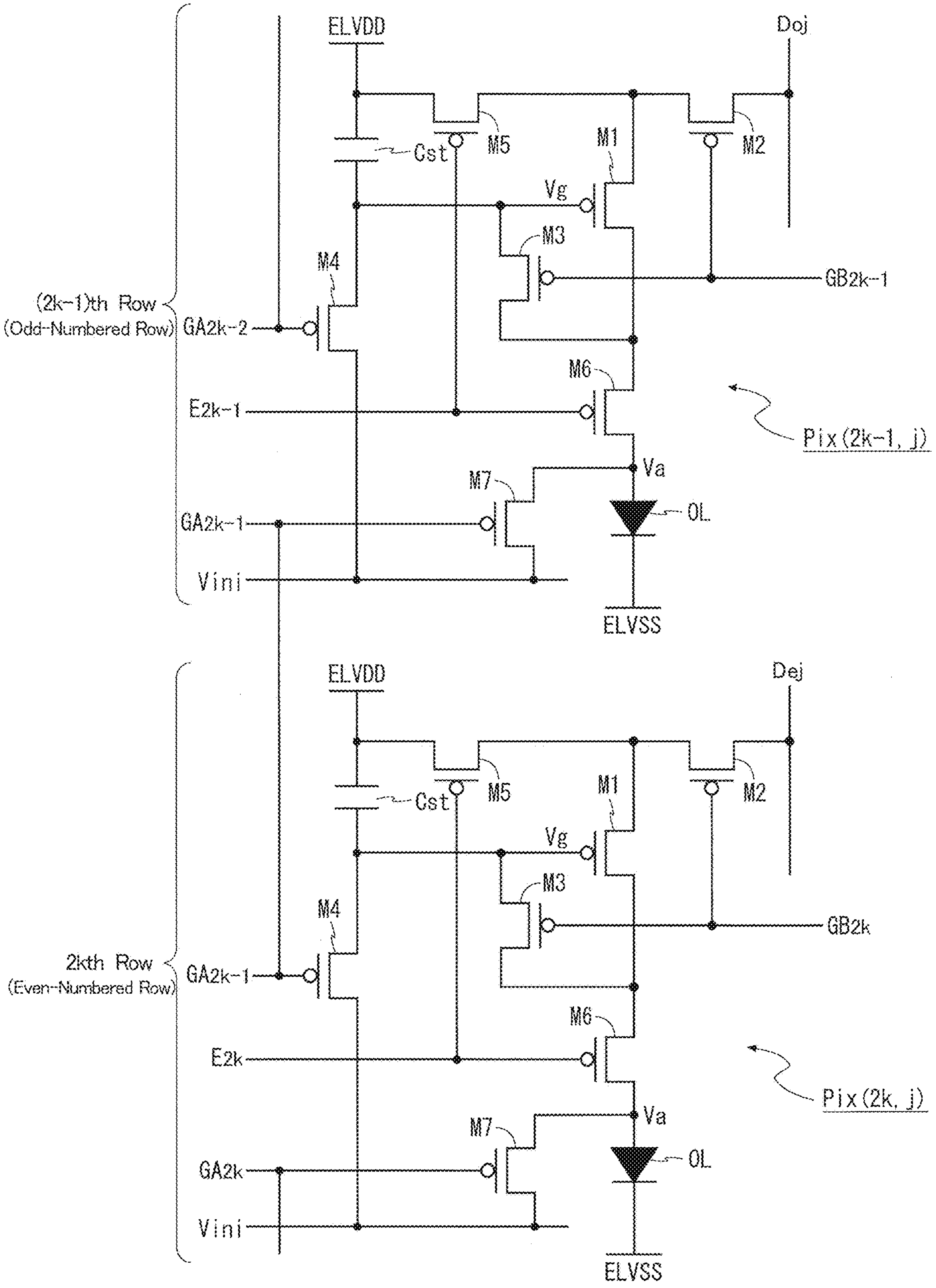
FIG. 9 is a circuit diagram for describing details of a writing operation into a pixel circuit in the first embodiment.
Figure 10:
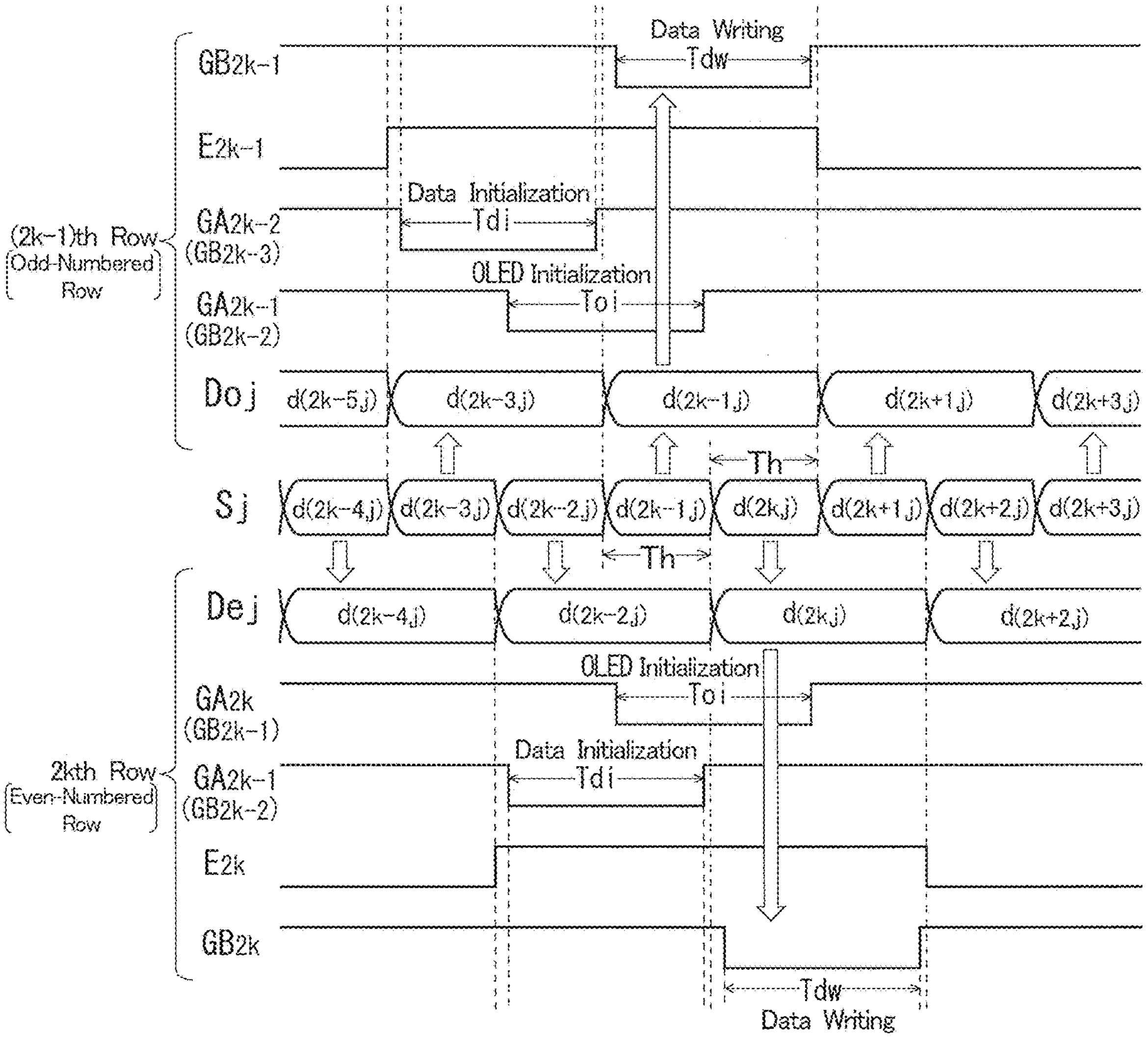
FIG. 10 is a timing chart for describing the details of the writing operation into the pixel circuit in the first embodiment.

Next, details of the writing operation into the pixel circuit 15 in the present embodiment will be described with reference to FIGS. 9 and 10, focusing on the pixel circuit Pix(2k−1, j) in which "io" is (2k−1)th, which is an odd-numbered pixel circuit, and the pixel circuit Pix(2k, j) in which "ie" is 2kth, which is an even-numbered pixel circuit, in the jth pixel circuit columns Pix(1, j) to Pix(n, j). FIG. 9 is a circuit diagram illustrating configurations of the pixel circuits Pix(2k−1, j), Pix(2k, j) in the present embodiment. This configuration is obvious from the description of the circuit diagram illustrated in FIG. 2, and hence the description thereof will be omitted. FIG. 10 is a timing chart for describing the details of the writing operations into the pixel circuits Pix(2k−1, j), Pix(2k, j).

In the circuit configuration of the internal compensation system as illustrated in FIG. 9, the wiring of the reset signal line GA2*k*−1 for releasing the accumulated charge (hereinafter also referred to as an "OLED charge") in the parasitic capacitance of the organic EL element OL in a certain pixel circuit Pix(2k−1, j) and the wiring of the reset signal line GA2*k*−1 for initializing the holding capacitor Cst in the pixel circuit Pix(2k, j) corresponding to an immediately subsequent pixel circuit in the data writing order (data initialization, that is, initialization of the gate voltage Vg) are common.

In the present embodiment, a pair of the data signal line group (Doj, Dej) made up of two data signal lines is provided for each pixel circuit column. However, if the selection period of the scanning signal line GBi is simply doubled in order to make the data writing period twice as long as the known data writing period by providing the two data signal lines Doj, Dej for each of the pixel circuit columns Pix(1, j) to Pix(n, j), the data initialization period and the data writing period partially overlap. In the present embodiment, in order to avoid this, there are used two types of scanning signal lines made up of reset scanning signal lines GA0 to GAn for controlling the first and second initialization transistors M4, M7 and writing control scanning signal lines GB1 to GBn for controlling the writing control transistor M2 and the like. However, as can be seen from FIG. 4, the signal of the (p−1)th writing control scanning signal line GBp−1 can be used as the signal of the pth reset scanning signal line GAp (p=2 to n).

In the present embodiment, as illustrated in FIG. 10, the voltage of the jth data signal Sj output from the data-side drive circuit 30 is switched every one horizontal period Th, and data voltages ( . . . , d(2k−2, j), d(2k−1, j), d(2k, j), d(2k+1, j), . . . ) to be applied to the pixel circuits Pix(1, 1) to Pix(n, j) in the jth column are sequentially provided to the signal distributor 5*j*. The signal distributor 5*j* distributes these data voltages to the jth odd-numbered row data signal line Doj and the jth even-numbered row data signal line Dej on the basis of the switching control signal Csw (see FIGS. 3 and 4). As illustrated in FIG. 10, for example, among the voltages of the jth data signal Sj, the voltages d(2k−3, j), d(2k−1, j), d(2k+1, j) to be written into the odd-numbered pixel circuits Pix(2k−3, j), Pix(2k−1, j), Pix(2k+1, j) in the jth column pixel circuit are provided to the jth odd-numbered row data signal line Doj, and the odd-numbered row data signal line Doj sequentially holds the voltages d(2k−3, j), d(2k−1, j), d(2k+1, j) for approximately two horizontal periods (2Th) each. Among the voltages of the jth data signal Sj, the voltages d(2k−2, j), d(2k, j), d(2k+2, j) to be written into the even-numbered pixel circuits Pix(2k−2, j), Pix(2k, j), Pix(2k+2, j) in the jth column pixel circuit are provided to the jth even-numbered row data signal line Dej, and the even-numbered row data signal line Dej sequentially holds the voltages d(2k−2, j), d(2k, j), d(2k+2, j) for approximately two horizontal periods (2Th) each at timing shifted from the odd-numbered row data signal line Doj by one horizontal period Th.

The voltages d(2k−3, j), d(2k−1, j), d(2k+1, j) sequentially held in the jth odd-numbered row data signal line Doj in this manner are respectively written into the odd-numbered pixel circuits Pix(2k−3, j), Pix(2k−1, j), Pix(2k+1, j) in the jth column pixel circuit in response to the driving of the scanning signal lines GB2*k*−3, GB2*k*−1, and GB2*k*+1. Thereby, the voltages d(2k−3, j), d(2k−1, j), d(2k+1, j) are held in the holding capacitors Cst in the odd-numbered pixel circuits Pix(2k−3, j), Pix(2k−1, j), Pix(2k+1, j) as data voltages, respectively.

Now, focusing on the upper pixel circuit illustrated in FIG. 9, that is, the pixel circuit Pix(2k−1, j) in the (2k−1)th row and the jth column, an operation when the voltage d(2k−1, j) of the odd-numbered row data signal line Doj is written as a data voltage into the pixel circuit Pix(2k−1, j) will be described with reference to FIG. 10. In the pixel circuit Pix(2k−1, j), a period during which the (2k−1)th emission control line E1*k*−1 is at H level is a non-emission period, a period during which the (2k−2)th reset signal line GA2*k*−2 is at L level is a data initialization period Tdi, a period during which the (2k−1)th reset signal line GA2*k*−1 is L is an OLED initialization period Toi, and a period during which the (2k−1)th scanning signal line GB2k−1 is L is a data writing period Tdw (see FIGS. 4 and 10). As can be seen from the configuration illustrated in FIG. 9, in the pixel circuit Pix(2k−1, j), the first initialization transistor M4 is turned on in the data initialization period Tdi to initialize the holding capacitor Cst (and the gate voltage Vg), the second initialization transistor M7 is turned on in the OLED initialization period Toi to release the OLED charge (the accumulated charge in the parasitic capacitance of the organic EL element OL), the writing control transistor M2 and the threshold compensation transistor M3 are turned on in the data writing period Tdw after the data initialization period Tdi, and the voltage d(2k−1, j) of the odd-numbered row data signal line Doj at that time is provided as the data voltage Vdata to the holding capacitor Cst via the drive transistor M1 in the diode-connected state. As a result, the gate voltage (the voltage of the gate terminal of the drive transistor M1) Vg changes toward the value given by Equation (3) described above during the data writing period Tdw.

Next, focusing on the lower pixel circuit illustrated in FIG. 9, that is, the pixel circuit Pix(2k, j) in the 2kth row and the jth column, an operation when the voltage d(2k, j) of the even-numbered row data signal line Dej is written as a data voltage into the pixel circuit Pix(2k, j) will be described with reference to FIG. 10. In the pixel circuit Pix(2k, j), a period during which the 2kth emission control line E1*k* is at H level is a non-emission period, a period during which the (2k−1)th reset signal line GA2*k*−1 is at L level is a data initialization period Tdi, a period during which the 2kth reset signal line GA2*k is at L level is an OLED initialization period Toi, and a period during which the* 2kth scanning signal line GB2*k* is at L level is a data writing period Tdw (see FIGS. 4 and 10). As can be seen from the configuration illustrated in FIG. 9, in the pixel circuit Pix(2k, j) as well, the first initialization transistor M4 is turned on in the data initialization period Tdi to initialize the holding capacitor Cst (and the gate voltage Vg), the second initialization transistor M7 is turned on in the OLED initialization period Toi to release the OLED charge, the writing control transistor M2 and the threshold compensation transistor M3 are turned on in the data writing period Tdw after the data initialization period Tdi, and the voltage d(2k, j) of the even-numbered row data signal line Dej at that time is provided as the data voltage Vdata to the holding capacitor Cst via the drive transistor M1 in the diode-connected state. As a result, the gate voltage Vg changes toward the value given by Equation (3) described above during the data writing period Tdw.

Thereafter, when the (2k−1)th emission control line E1*k*−1 changes from H level to L level, in the pixel circuit Pix(2k−1, j) in the (2k−1)th row and the jth column, the organic EL element OL emits light with a luminance corresponding to the voltage held in the holding capacitor Cst. When the 2kth emission control line E1*k* changes from H level to L level, in the pixel circuit Pix(2k, j) in the 2kth row and the jth column, the organic EL element OL emits light with a luminance corresponding to the voltage held in the holding capacitor Cst. The operations of the pixel circuits Pix(2k−1, j), Pix(2k, j) at this time are as described above with reference to FIG. 4 (see Equation (4) described above).

<1.5 Effects>

According to the present embodiment as described above, in the display portion 11, for each of the pixel circuit columns Pix(1, j) to Pix(n, j), a data signal line group made up of the odd-numbered row data signal line Doj and the even-numbered row data signal line Dej is provided (j=1 to m), and among the pixel circuit columns, the voltage of the odd-numbered row data signal line Doj is provided as a data voltage to the odd-numbered pixel circuit Pix(io, j) (io=2k−1, 1≤io≤n), and the voltage of the even-numbered row data signal line Dej is provided as a data voltage to the even-numbered pixel circuit Pix(ie, j) (ie=2k, 1≤ie≤n) (FIGS. 1, 7, and 8). Thereby, the data writing period in each pixel circuit Pix(i, j) (i=1 to n, j=1 to m) can be made approximately twice as long as the known data writing period (see FIGS. 6 and 8). Thus, in the case of using the pixel circuit of the internal compensation system as illustrated in FIG. 2, even when the switching cycle of the data voltage output as a data signal from the data-side drive circuit is shortened due to, for example, an increase in resolution or the like, the holding capacitor in the pixel circuit can be sufficiently charged in accordance with the data voltage, and the display quality can be maintained satisfactorily.

According to the present embodiment, each data signal Sj output from the data-side drive circuit 30 is distributed to the odd-numbered row data signal line Doj and the even-numbered row data signal line Dej via the signal distributor 5*j* (see FIGS. 1, 3, and 7). It is therefore possible to sufficiently charge the holding capacitor in accordance with the data voltage in the pixel circuit of the internal compensation system while using the data-side drive circuit similar to the known one.

2. Second Embodiment

Next, an organic EL display device according to a second embodiment will be described. In the present embodiment, the connection relationship between the data signal line and the pixel circuit in the display portion and the temporal order of the voltage d(i, j) indicated by the data signal Sj output from the data-side drive circuit differ from those of the first embodiment, but except for these points, the overall configuration of the organic EL display device according to the present embodiment is substantially the same as that in the first embodiment. Therefore, in the configuration in the present embodiment, the same or corresponding parts as those in the first embodiment are denoted by the same reference numerals, and a detailed description thereof is omitted.

Figure 11:
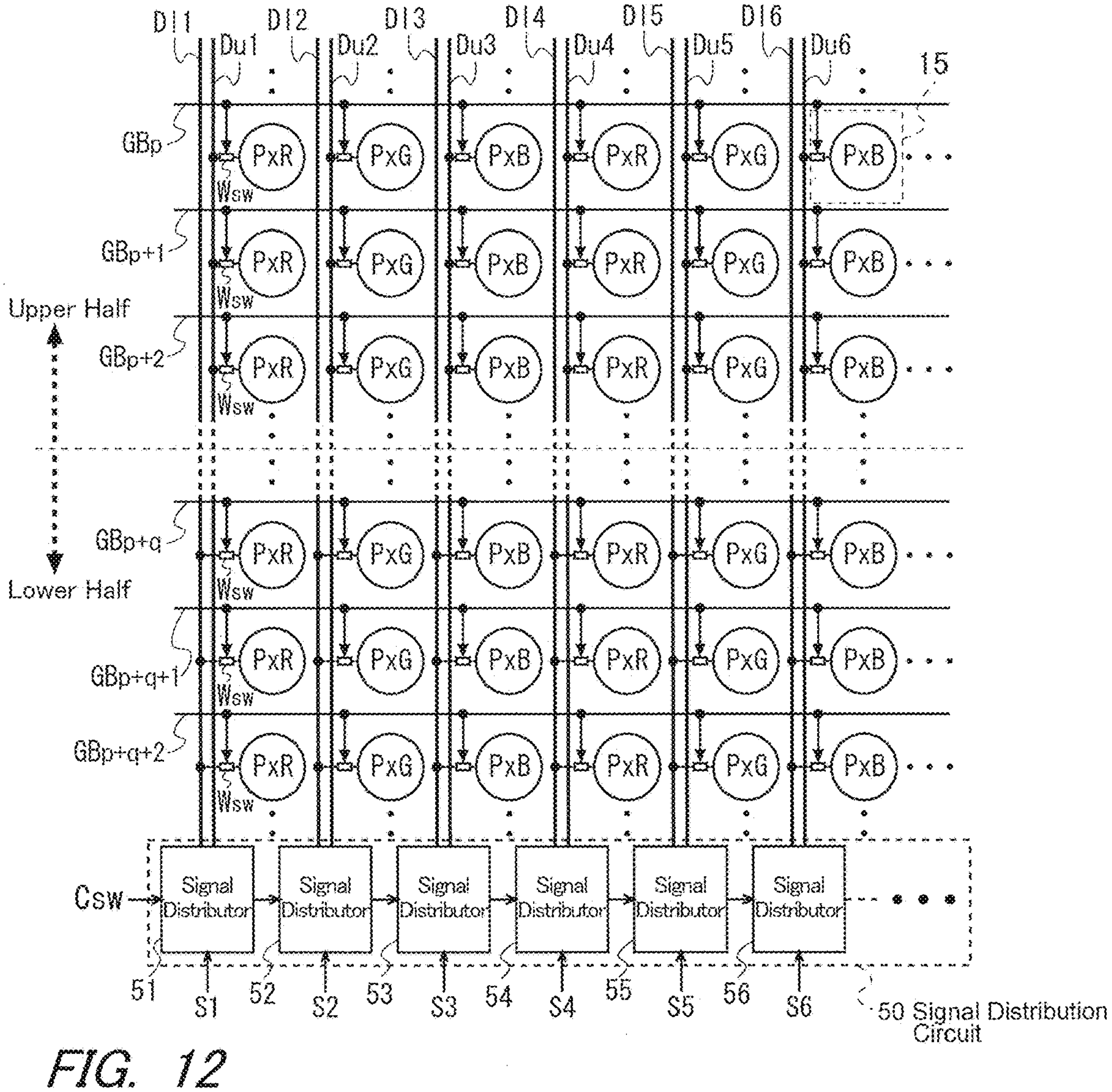
FIG. 11 is a diagram schematically illustrating an electrical configuration of a display portion in a second embodiment.

FIG. 11 is a diagram schematically illustrating the electrical configuration of the display portion 11 according to the present embodiment. In the present embodiment as well, similarly to the first embodiment, the voltage of each data signal Sj is switched every one horizontal period Th, and two data signal lines constituting one data signal line group are disposed to correspond to each of the pixel circuit columns Pix(1, j) to Pix(n, j). In the first embodiment, as illustrated in FIG. 7, one data signal line group corresponding to each pixel circuit column is made up of the odd-numbered row data signal line Doj connected to the odd-numbered pixel circuits Pix(1, j), Pix(3, j), . . . in the each pixel circuit column, and the even-numbered row data signal line Dej connected to the even-numbered pixel circuits Pix(2, j), Pix(4, j), . . . in the each pixel circuit column. In contrast, in the present embodiment, as illustrated in FIG. 11, one data signal line group corresponding to each pixel circuit column is made up of an upper-row data signal line Duj connected to upper-half pixel circuits Pix(1, j) to Pix(n/2, j) in the each pixel circuit column, and a lower-row data signal line Dlj connected to lower-half pixel circuits Pix(n/2+1, j) to Pix(n, j) in the each pixel circuit column (n is an even number). In the present embodiment as well, a pixel circuit corresponding to the ith scanning signal line GBi and the jth data signal line group (Duj, Dlj) is also referred to as "a pixel circuit in the ith row and the jth column" and denoted by reference sign "Pix(i, j)".

Figure 12:
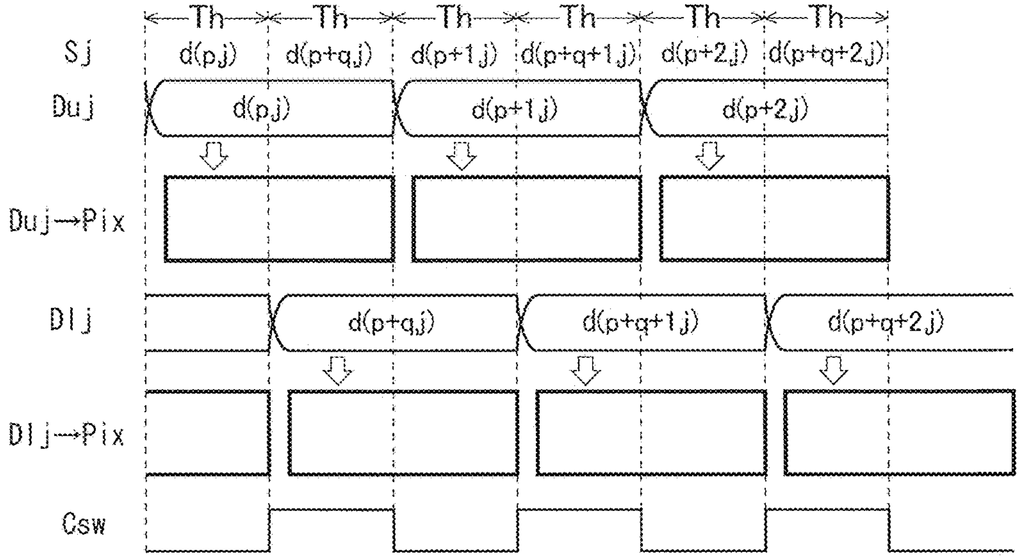
FIG. 12 is a timing chart for describing a writing operation of a data signal into a pixel circuit in the second embodiment.

FIG. 12 is a timing chart for describing a writing operation of a data signal into the pixel circuit 15 according to the present embodiment. In the present embodiment as well, similarly to the first embodiment (see FIG. 8), the voltage d(i, j) of each data signal Sj is switched every one horizontal period Th. However, in the present embodiment, since the pixel circuits Pix(1, j) to Pix(n, j) in each pixel circuit column are connected to the upper-row data signal line Duj and the lower-row data signal line Dlj constituting the data signal line group corresponding to the each pixel circuit column as described above (see FIG. 11), the data-side drive circuit 30 generates each data signal Sj as a voltage signal in which a voltage d(p+k, j) to be provided to the upper-half pixel circuit Pix(p+k, j) and a voltage d(p+q+k, j) to be provided to the lower-half pixel circuit Pix(p+q+k, j) in the corresponding pixel circuit column alternately appear, such as . . . , d(p, j), d(p+q, j), d(p+1, j), d(p+q+1, j), d(p+2, j), d(p+q+2, j), . . . as illustrated in FIG. 12 (k= . . . , 0, 1, 2, . . . ; j=1, 2, 3, . . . , m). Each data signal Sj as thus described is provided to the upper-row data signal line Duj and the lower-row data signal line Dlj via the signal distributor 5*j*. Thereby, as illustrated in FIG. 12, in the upper-half pixel circuit Pix(p+k, j) in each pixel circuit column, the voltage d(p+k, j) of the data signal Sj is provided to the pixel part PxX ("PxX" is any of "PxR", "PxG", and "PxB") from the corresponding upper-row data signal line Duj via the writing control switch Wsw in response to the driving of the scanning signal line GBp+k for approximately two horizontal periods (k= . . . , 0, 1, 2, . . . ). On the other hand, in the pixel circuit Pix(p+q+k, j) in the lower half of the each pixel circuit column, the voltage d(p+q+k, j) of the data signal Sj is provided to the pixel part PxX from the corresponding lower-row data signal line Dlj via the writing control switch Wsw in response to the driving of the scanning signal line GBp+q+k for approximately two horizontal periods at a timing shifted by one horizontal period from the voltage d(p+k, j) of the upper-row data signal line Duj.

In response to the driving of the data signal lines Dl1, Dui to Dlm, and Dum as described above (see FIG. 12), the scanning-side drive circuit 40 sequentially selects the scanning signal lines GB1 to GBn such that . . . , GBp, GBp+q, GBp+1, GBp+q+1, GBp+2, GBp+q+2, . . . . Specifically, the scanning signal lines Gp+k connected to the pixel circuits Pix(p+k, j) in the upper half of each pixel circuit column and the scanning signal lines GBp+q+k connected to the pixel circuits Pix(p+q+k, j) in the lower half thereof are alternately and sequentially selected for two horizontal periods each with an overlap of one horizontal period (k= . . . , 0, 1, 2, . . . ; j=1, 2, 3, . . . , m). The scanning-side drive circuit 40 drives the reset signal lines GA0 to GAn at timings corresponding to the driving of the scanning signal lines GB1 to GBn (see the signal reset signals GAi−2, GAi−1, GAi and the scanning signals GBi-2, GBi−1, GBi illustrated in FIG. 4).

On the basis of the data signal line switching control signal Csw generated by the display control circuit 20, the signal distributors 51 to 5*m* distributes the respective data signals Sj to the upper-row data signal line Duj and the lower-row data signal line Dlj as illustrated in FIG. 12. Further, the reset signal lines GA0 to GAn, the scanning signal lines GB1 to GBn, and the emission control lines E1 to En are driven by the scanning-side drive circuit (scanning signal line drive/emission control circuit) 40 so as to correspond to the data writing operation illustrated in FIG. 12. Thereby, in addition to the data writing operation as described above, the data initialization operation and the OLED initialization operation (the release of the accumulated charge in the parasitic capacitance of the organic EL element OL) are performed in the same manner as in the first embodiment, and the emission operation of the organic EL element OL is also performed in the same manner as in the first embodiment (see FIG. 4).

In the present embodiment described above as well, the data writing period in each pixel circuit Pix(i, j) (i=1 to n, j=1 to m) can be made approximately twice as long as the known data writing period, and each data signal Sj output from the data-side drive circuit 30 is distributed to the upper-row data signal line Duj and the lower-row data signal line Dlj via the signal distributor 5*j* (see FIGS. 11 and 12). Therefore, according to the present embodiment, similarly to the first embodiment, it is possible to sufficiently charge the holding capacitor in accordance with the data voltage in the pixel circuit of the internal compensation system while using the data-side drive circuit 30 similar to the known one.

3. Third Embodiment

In the first embodiment, each data signal Sj output from the data-side drive circuit 30 is provided to one pixel circuit column Pix(1, j) to Pix(n, j). However, instead of this, a system (hereinafter referred to as a "demultiplexer (DEMUX) system" or a "source shared driving (SSD) method") may be adopted in which time-division multiplexed data signals S1, S2, . . . are output from the data-side drive circuit 30, and each data signal Sj is demultiplexed and provided to two or more pixel circuit columns. Hereinafter, an example of an organic EL display device of the DEMUX system having the feature of the first embodiment for eliminating insufficient charging in data writing will be described as a third embodiment.

In the present embodiment, similarly to the first embodiment (FIG. 1), m×n pixel circuits 15 are provided in the display portion 11. The m×n pixel circuits 15 are arranged in a matrix along m data signal line groups (DoL1, DeL1), (DoR1, DeR1), . . . , (DoL(m/2), DeL(m/2)), (DoR(m/2), DeR(m/2)) and n scanning signal lines GB1, GB2, . . . , GBn (m is an even number), and each pixel circuit 15 corresponds to any one of the m data signal line groups (DoL1, DeL1), (DoR1, DeR1), . . . , (DoL(m/2), DeL(m/2)), (DoR(m/2), DeR(m/2)) and corresponds to any one of the n scanning signal lines GB1 to GBn. Similarly to the first embodiment, a signal distribution circuit 60 is provided to receive data signals S1 to S(m/2) from the data-side drive circuit 30 and distribute the received data signals to the data signal lines DoL1, DeL1, DoR1, DeR1, . . . , DoL(m/2), DeL(m/2), DoR(m/2), DeR(m/2), and the signal distribution circuit 60 includes signal distributor 61 to 6(*m*/2) corresponding to the data signals S1 to S(m/2), respectively. However, the present embodiment differs from the first embodiment in the configuration related to the signal distributor 6*j* as described later. Except for this point, the overall configuration of the organic EL display device according to the present embodiment is basically similar to that of the first embodiment (see FIG. 1), and hence the same or corresponding parts as those in the first embodiment are denoted by the same reference numerals, and a detailed description thereof is omitted.

Figure 13:
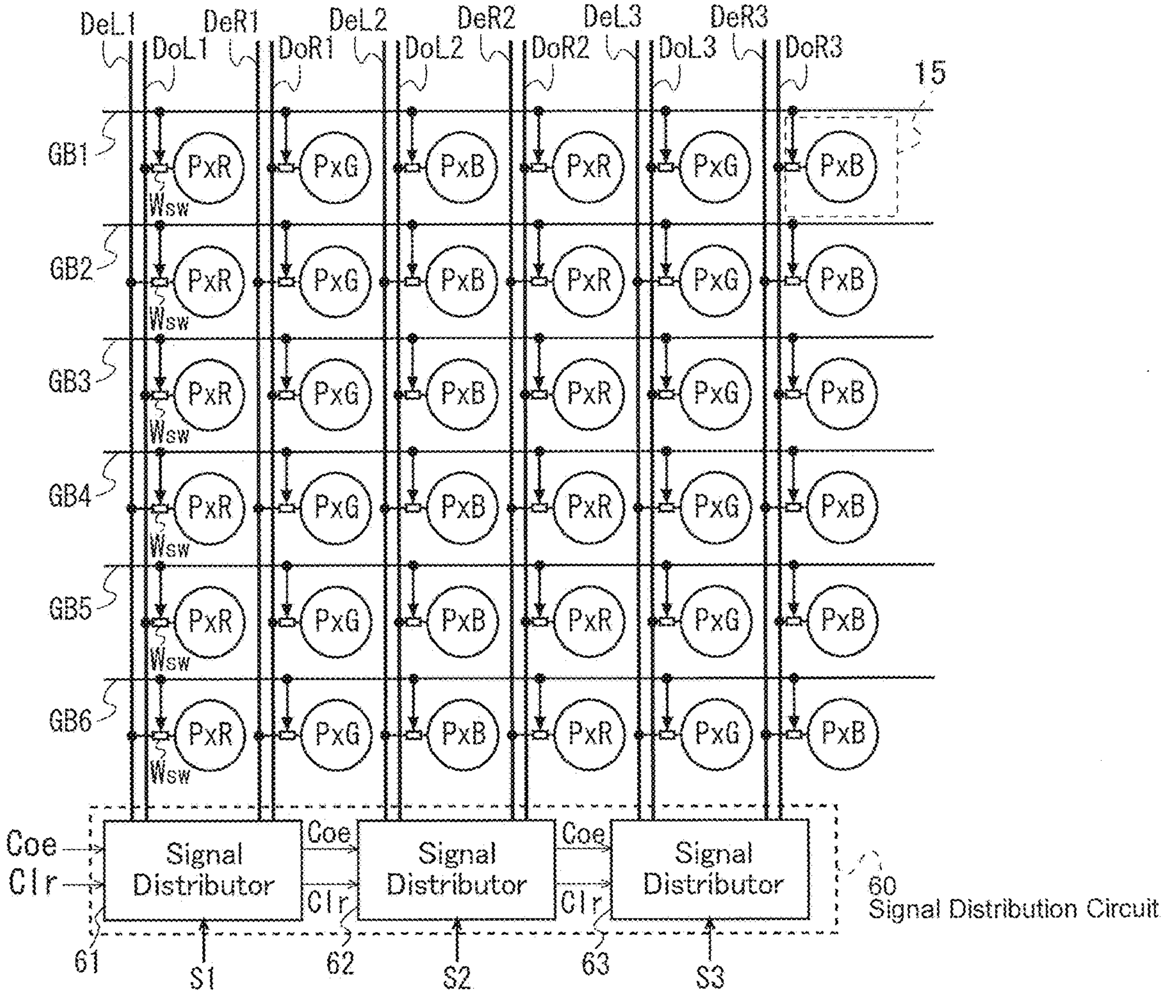
FIG. 13 is a view schematically illustrating an electrical configuration of a display portion in a third embodiment.

FIG. 13 is a diagram schematically illustrating the electrical configuration of the display portion 11 according to the present embodiment. In the present embodiment as well, similarly to the first embodiment, one data signal line group is disposed to correspond to each pixel circuit column Pix(1, j) to Pix(n, j), and the one data signal line group is made up of an odd-numbered row data signal line connected to odd-numbered pixel circuits Pix(1, j), Pix(3, j), . . . in the pixel circuit column, and an even-numbered row data signal line connected to even-numbered pixel circuits Pix(2, j), Pix(4, j), . . . in the each pixel circuit column. In the present embodiment, the data signal lines in the display portion 11 are grouped into a plurality of sets (three sets in the configuration example of FIG. 13) with two adjacent data signal line groups as one set, and of the two data signal line groups in each set, the one disposed on the left side in FIG. 13 is referred to as an "L data signal line group", and the one disposed on the right side is referred to as an "R data signal line group". In the jth L data signal line group, the odd-numbered row data signal line is referred to as an "odd-numbered row L data signal line DoLj", and the even-numbered row data signal line is referred to as an "even-numbered row L data signal line DeLj". In the jth R data signal line group, the odd-numbered row data signal line is referred to as an "odd-numbered row R data signal line DoRj", and the even-numbered row data signal line is referred to as an "even-numbered row R data signal line DeRj". In the present embodiment, a pixel circuit corresponding to the ith scanning signal line GBi and the L data signal line group (DoLj, DeLj) in the jth set is also referred to as "a pixel circuit in the ith row and the (2j−1)th column" and denoted by reference numeral "Pix(i, 2j−1)", and a pixel circuit corresponding to the ith scanning signal line GBi and the R data signal line group (DoRj, DeRj) in the jth set is also referred to as "a pixel circuit in the ith row and the 2jth column" and denoted by reference numeral "Pix(i, 2j)". In FIG. 13, for convenience of description, the number m of the data signal line groups (DoLj, DeLj) or (DoRj, DeRj) and the number n of the scanning signal lines GBi are six (j=1 to 3, i=1 to 6), and each pixel circuit 15 (Pix(i, 2j−1) or Pix(i, 2j)) includes a pixel part PxX, which is one of pixel parts PxR, PxG, PxB, and the writing control switch Wsw.

As illustrated in FIG. 13, in the present embodiment, each signal distributor **6*j* in the signal distribution circuit 60 receives a corresponding data signal Sj (j=1, 2, and 3). The signal distributor 61 to 63 respectively correspond to three sets each made up of two data signal line groups (DoLj, DeLj), (DoRj, DeRj), and to each signal distributor 6*j***, two data signal line groups (DoLj, DeLj), (DoRj, DeRj) in the corresponding set are connected.

Figure 14:
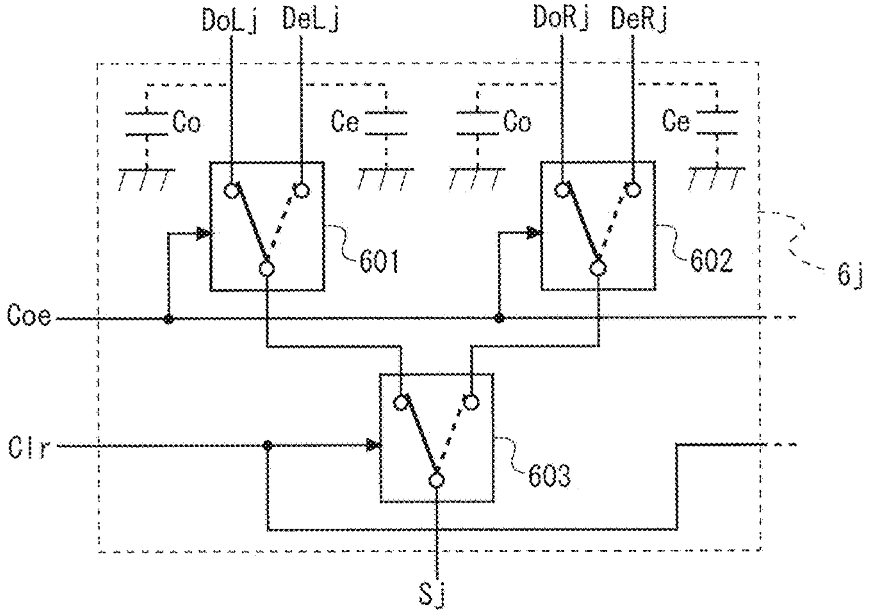
FIG. 14 is a circuit diagram illustrating a configuration example of a signal distributor in the third embodiment.

FIG. 14 is a circuit diagram illustrating a configuration example of the signal distributor **6*j* to which the jth data signal Sj among the data signals S1 to S(m/2) output from the data-side drive circuit 30 is input, that is, the jth signal distributor 6*j* in the present embodiment (j=1 to m/2) (m=6 in the example of FIG. 13). The signal distributor 6*j* includes first, second, and third changeover switches 601,602,603, an OE switching control signal Coe is provided to the first and second changeover switches 601,602, and an LR switching control signal Clr is provided to the third changeover switch 603. The OE switching control signal Coe and the LR switching control signal Clr are generated by the display control circuit 20. Each of the changeover switches 601, 602,603 has one input terminal and two output terminal, and the input terminal is connected to one of the two output terminals in accordance with the provided switching control signals Coe, Clr. Each of the changeover switches 601,602, 603 can be implemented by using, for example, two P-channel thin-film transistors like the changeover switch 502 in the signal distributor 5*j* used in the first embodiment (see (B) of FIG. 3**).

According to the configuration example illustrated in FIG. 14, in the third changeover switch 603, the data signal Sj is provided to its input terminal, its one output terminal is connected to the input terminal of the first changeover switch 601, and its other output terminal is connected to the input terminal of the second changeover switch 602. The odd-numbered row L data signal line DoLj and the even-numbered row L data signal line DeLj constituting the L data signal line group among the two data signal line groups corresponding to the signal distributor **6*j* are connected to one and the other output terminals of the first changeover switch 601, respectively, and the odd-numbered row R data signal line DoRj and the even-numbered row R data signal line DeRj constituting the R data signal line group among the two data signal line groups are connected to one and the other output terminals of the second changeover switch 602, respectively. The third changeover switch 603 is configured such that when the LR switching control signal Clr is at L level, its input terminal, which inputs the data signal Sj, is connected to the input terminal of the first changeover switch 601 via its one output terminal, and when the LR switching control signal Clr is at H level, its input terminal is connected to the input terminal of the second changeover switch 602 via its other output terminal. The first changeover switch 601 is configured such that when the OE switching control signal Coe is at L level, its input terminal is connected to the odd-numbered row L data signal line DoLj via its one output terminal, and when the OE switching control signal Coe is at H level, its input terminal is connected to the even-numbered row L data signal line DeLj via its other output terminal. The second changeover switch 602** is configured such that when the OE switching control signal Coe is at L level, its input terminal is connected to the odd-numbered row R data signal line DoRj via its one output terminal, and when the OE switching control signal Coe is at H level, its input terminal is connected to the even-numbered row R data signal line DeRj via its other output terminal.

Note that the voltage of the data signal Sj provided from the data-side drive circuit 30 to the corresponding data signal line DxYj (x is "o" or "e" and Y is "L" or "R") via the signal distributor **6*j* is held by the wiring capacitance of the corresponding data signal line DxYj even after the corresponding data signal line DxYj is electrically disconnected from the output terminal of the data-side drive circuit 30. In order to ensure this voltage holding, a capacitance Co connected to each of the corresponding odd-numbered row data signal lines DoLj, DoRj may be provided in the signal distributor 6*j*, and a capacitance Ce connected to each of the corresponding even-numbered row data signal lines DeLj, DeRj may be provided (see FIG. 14**).

Figure 15:
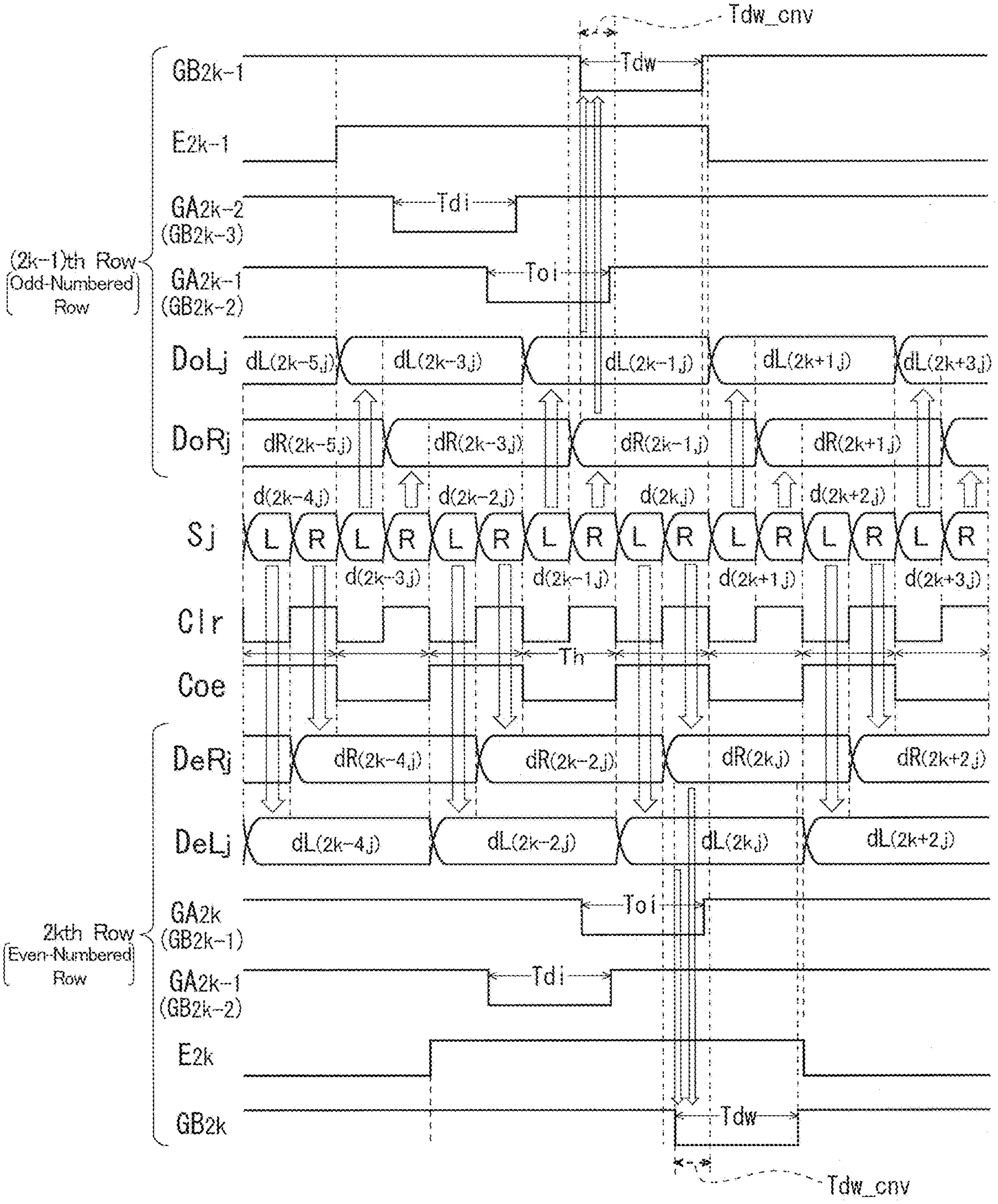
FIG. 15 is a timing chart for describing driving of a pixel circuit in the third embodiment.

Next, details of the writing operation into the pixel circuit 15 in the present embodiment will be described with reference to FIG. 15, focusing on the (2k−1)th pixel circuit Pix(2k−1, 2j−1) and the 2kth pixel circuit Pix(2k, 2j−1), which are respectively the odd-numbered pixel circuit and the even-numbered pixel circuit in the pixel circuit column corresponding to the jth L data signal line group (DoLj, DeLj), and the (2k−1)th pixel circuit Pix(2k−1, 2j) and the 2kth pixel circuit Pix(2k, 2j), which are respectively the odd-numbered pixel circuit and the even-numbered pixel circuit in the pixel circuit column corresponding to the jth R data signal line group (DoRj, DeRj). FIG. 15 is a timing chart for describing the writing operations into the pixel circuits Pix(2k−1, 2j−1), Pix(2k, 2j−1), Pix(2k−1, 2j), Pix (2k, 2j). Note that the pixel circuit 15 in the present embodiment is also configured as illustrated in FIG. 2 similarly to the first embodiment.

In the present embodiment, as illustrated in FIG. 15, the voltage of the jth data signal Sj output from the data-side drive circuit 30 is switched every ½ of one horizontal period Th, and the data signal Sj indicates a voltage to be provided to the L data signal line group (DoLj, DeLj) in the first half of each horizontal period Th and indicates a voltage to be provided to the R data signal line group (DoRj, DeRj) in the second half of each horizontal period Th (in FIG. 15, in a waveform illustrating the data signal Sj, "L" is added to a portion indicating the former voltage, and "R" is added to a portion indicating the latter voltage). For example, in the horizontal period Th in which the two pixel circuits Pix(2k−1, 2j−1), Pix(2k−1, 2j) in the (2k−1)th row are driven by the data signal Sj, the data signal Sj indicates the data voltage dL(2k−1, j) to be provided to the pixel circuit Pix(2k−1, 2j−1) corresponding to the L data signal line group among the two pixel circuits in the first half and indicates the data voltage dR(2k−1, j) to be provided to the pixel circuit Pix(2k−1, 2j) corresponding to the R data signal line group in the second half. In the waveform of the data signal Sj illustrated in FIG. 15, the data voltages dL(2k−1, j), dR(2k−1, j) are collectively indicated by reference sign "d(2k−1, j)".

As illustrated in FIG. 15, in the first half of the horizontal period Th in which the two pixel circuits Pix(2k−1, 2j−1), Pix(2k−1, 2j) in the (2k−1)th row are driven by the jth data signal Sj, both the LR switching control signal Clr and the OE switching control signal Coe are at L level, so that the data signal Sj is provided to the odd-numbered row L data signal line DoLj via the third changeover switch 603 and the first changeover switch 601 in the signal distributor **6*j* (see FIG. 14). The odd-numbered row L data signal line DoLj holds the voltage dL(2k−1, j) indicated by the data signal Sj for approximately two horizontal periods. In the latter half of the horizontal period Th, the LR switching control signal Clr is at H level and the OE switching control signal Coe is at L level, so that the data signal Sj is provided to the odd-numbered row R data signal line DoRj via the third changeover switch 603 and the second changeover switch 602 in the signal distributor 6*j* (see FIG. 14**). The odd-numbered row R data signal line DoRj holds the voltage dR(2k−1, j) indicated by the data signal Sj for approximately two horizontal periods.

In this way, the voltages dL(2k−1, j), dR(2k−1, j), respectively held in the odd-numbered row L data signal line DoLj and the odd-numbered row R data signal line DoRj, are written into the two pixel circuits Pix(2k−1, 2j−1), Pix(2k−1, 2j), respectively, in the data writing period Tdw during which the scanning signal line GB**2*k*−1 corresponding to the pixel circuits in the (2k−1)th row is in the selected state (L level). Note that not only the scanning signal lines GB1 to GBn but also the emission control lines E1 to En and the reset signal lines GA0 to GAn are driven in the same manner as in the first embodiment (see FIG. 10). In the two pixel circuits Pix(2k−1, 2j−1), Pix(2k−1, 2j), a period during which the (2k−1)th emission control line E2*k*−1 is at H level is a non-emission period, a period during which the (2k−2)th reset signal line GA2*k*−2 is at L level is a data initialization period Tdi, a period during which the (2k−1)th reset signal line GA2*k*−1 is at L level is an OLED initialization period Toi, and a period during which the scanning signal line GB2*k*−1 is at L level is a data writing period Tdw (see FIGS. 2 and 15). As can be seen from FIG. 15**, the lengths of the data initialization period Tdi, the OLED initialization period Toi, and the data writing period Tdw are all approximately 1.5 horizontal periods.

Thereafter, when the (2k−1)th emission control line E**1*k***−1 changes from H level to L level, the organic EL element OL emits light with a luminance corresponding to the voltage held in the holding capacitor Cst in each of the two pixel circuits Pix(2k−1, 2j−1), Pix(2k−1, 2j).

As illustrated in FIG. 15, in the half of the horizontal period Th in which the two pixel circuits Pix(2k, 2j−1), Pix(2k, 2j) in the 2kth row are driven by the jth data signal Sj, the LR switching control signal Clr is at L level and the OE switching control signal Coe is at H level, so that the data signal Sj is provided to the even-numbered row L data signal line DeLj via the third changeover switch 603 and the first changeover switch 601 in the signal distributor **6*j* (see FIG. 14). The even-numbered row L data signal line DeLj holds the voltage dL(2k, j) indicated by the data signal Sj for approximately two horizontal periods. In the latter half of the horizontal period Th, both the LR switching control signal Clr and the OE switching control signal Coe are at H level, so that the data signal Sj is provided to the even-numbered row R data signal line DeRj via the third changeover switch 603 and the second changeover switch 602 in the signal distributor 6*j* (see FIG. 14**). The even-numbered row R data signal line DeRj holds the voltage dR(2k, j) indicated by the data signal Sj for approximately two horizontal periods.

In this manner, the voltages dL(2k, j), dR(2k, j), respectively held in the even-numbered row L data signal line DeLj and the even-numbered row R data signal line DeRj, are written into the two pixel circuits Pix(2k, 2j−1), Pix(2k, 2j), respectively, in the data writing period Tdw during which the scanning signal line GB**2*k* corresponding to the pixel circuits in the 2kth row is at L level. Note that not only the scanning signal lines GB1 to GBn but also the emission control lines E1 to En and the reset signal lines GA0 to GAn are driven in the same manner as in the first embodiment (see FIG. 10). In the two pixel circuits Pix(2k, 2j−1), Pix(2k, 2j), a period during which the 2kth emission control line E2*k* is at H level is a non-emission period, a period during which the (2k−1)th reset signal line GA2*k*−1 is at L level is a data initialization period Tdi, and a period during which the 2kth reset signal line GA2*k* is at the L is an OLED initialization period Toi (see FIGS. 2 and 15). As can be seen from FIG. 15**, the lengths of the data initialization period Tdi, the OLED initialization period Toi, and the data writing period Tdw are all about 1.5 horizontal periods.

Thereafter, when the 2kth emission control line E**2*k*** changes from H level to L level, in each of the two pixel circuits Pix(2k, 2j−1), Pix(2k, 2j), the organic EL element OL emits light with a luminance corresponding to the voltage held in each holding capacitor Cst.

As described above, in the present embodiment, the signal obtained by time-division multiplexing the data voltages to be respectively provided to the L data signal line group (DoLj, DeLj) and the R data signal line group (DoRj, DeRj) constituting one set is output as the data signal Sj from each output terminal of the data-side drive circuit 30 (j=1, 2, . . . , m/2), and the voltage indicated by the data signal Sj is demultiplexed by the signal distributor **6*j* into voltages to be sorted to the L data signal line group (DoLj, DeLj) and voltages to be sorted to the R data signal line group (DoRj, DeR) (see FIGS. 14 and 15). Further, the voltages dL(2k−1, j), dL(2k, j) indicated by the data signal Sj to be sorted to the L data signal line group (DoLj, DeLj) are respectively provided to the odd-numbered row L data signal line DoLj and the even-numbered row L data signal line DeLj by the signal distributor 6*j* (see FIGS. 14 and 15). In this way, the present embodiment is configured to incorporate the feature of the first embodiment in the organic EL display device adopting the DEMUX system (see FIGS. 3, 7, 10, and 13 to 15**).

In general, when the DEMUX system is adopted in the driving of the data signal line, the number of output terminals and the circuit amount of the data-side drive circuit can be reduced, but the length of the data writing period from the data signal line to the pixel circuit decreases. For example, when the DEMUX system having a multiplicity of 2 is adopted as in the present embodiment, the data writing period is a period Tdw_cnv illustrated in FIG. 15 in the known configuration, and the length thereof is about a ½ horizontal period. In contrast, in the present embodiment, since two data signal lines made up of the odd-numbered row data signal line DoYj and the even-numbered row data signal line DeYj (Y is either "L" or "R") are provided for each pixel circuit column (FIG. 13), the data writing period from the data signal line to the pixel circuit is the period Tdw illustrated in FIG. 15, and the length thereof is about 1.5 horizontal periods. That is, according to the present embodiment, in the display device adopting the DEMUX system, it is possible to ensure the data writing period having about three times (at least more than two times) the known length. It is therefore possible to sufficiently charge the holding capacitor in the pixel circuit in accordance with the data voltage while obtaining the above advantage by the DEMUX system.

In the configuration illustrated in FIG. 15, the writing timing (data writing period Tdw) from the data signal line DxYj (x is "o" or "e" and Y is "L" or "R") into the pixel circuit 15 is the same in the odd-numbered row L data signal line DoLj and the odd-numbered row R data signal line DoRj, and is the same in the even-numbered row L data signal line DeLj and the even-numbered row R data signal line DeRj. However, the lengths of the periods during which the data signal Sj is applied from the data-side drive circuit 30 to the data signal lines DxYj via the signal distributor 6*j* do not necessarily need to match. For example, the application period of the data signal Sj to the L data signal line DxLj in which the application of the data signal Sj is started earlier between the L data signal line DxLj and the R data signal line DxRj (x is either "o" or "e") may be made shorter than the application period of the data signal Sj to the R data signal line DxRj. Thereby, the data writing period Tdw from the data signal line DxYj to the pixel circuit 15 can be lengthened.

4. Fourth Embodiment

In a color image display device, usually, a color image is represented using a plurality of subpixels having different colors as display units. For example, a color image is displayed using three subpixels made up of an R subpixel, a G subpixel, and a B subpixel corresponding to three primary colors as display units. However, there is a case where a pixel array structure in which a color image is displayed using four subpixels made up of one R subpixel, one B subpixel, and two G subpixels as display units (hereinafter referred to as an "RBGG pixel array structure") is adopted. Hereinafter, an organic EL display device adopting such a pixel array structure will be described as a fourth embodiment.

Figure 16:
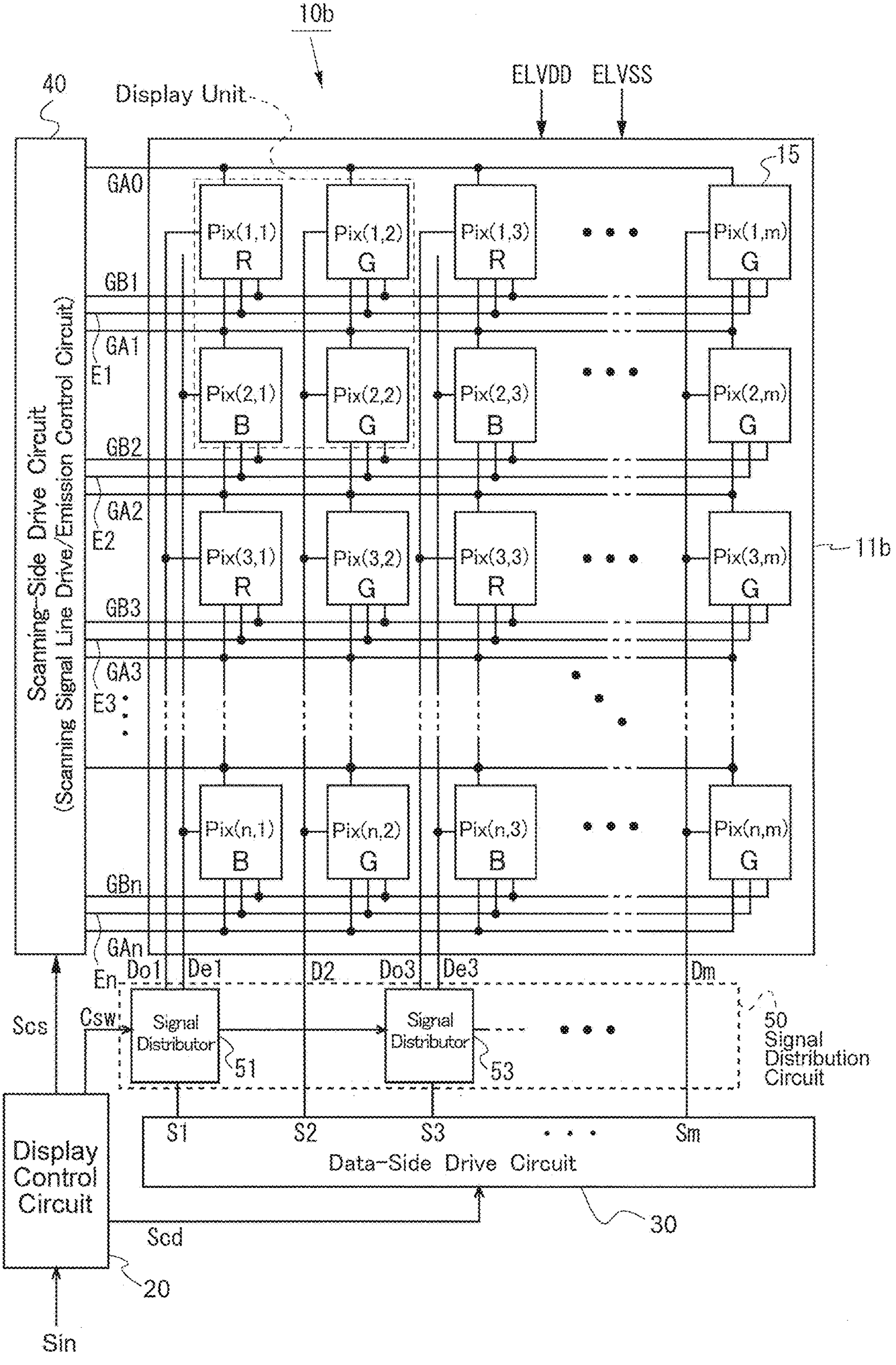
FIG. 16 is a block diagram illustrating an overall configuration of a display device according to a fourth embodiment.

FIG. 16 is a block diagram illustrating an overall configuration of an organic EL display device 10*b* according to the present embodiment. The display device 10*b* is also an organic EL display device of the internal compensation system and includes a signal distribution circuit 50 that receives data signals output from the data-side drive circuit 30 and provides the data signals to data signal lines in the display portion 11*b*. However, unlike the above first embodiment including m signal distributors 51 to 5*m* respectively corresponding to the data signals S1 to Sm from the data-side drive circuit 30, the signal distribution circuit 50 in the present embodiment includes m/2 signal distributors 51, 53, . . . , 5(*m*−1) respectively corresponding to the odd-numbered data signals S1, S3, . . . , Sm−1, but does not include signal distributors corresponding to the even-numbered data signals S2, S4, . . . , Sm (m is an even number). Similarly to the first embodiment, the display portion 11*b* includes n×m pixel circuits 15, and m pixel circuit columns extending along the data signal line are constituted by these pixel circuits 15. However, the present embodiment differs from the first embodiment in a specific configuration of the display portion 11 (see FIGS. 1 and 16). That is, as illustrated in FIG. 16, the display portion 11*b* in the present embodiment includes: two kinds of pixel circuit columns including: a pixel circuit column (hereinafter, referred to as an "RB pixel circuit column" or a "two-color pixel circuit column") in which pixel circuits (hereinafter, each pixel circuit is referred to as an "R pixel circuit" when distinguished from other pixel circuits having different emission colors) 15 each including an organic EL element OL that emits red light and forming an R subpixel and pixel circuits (hereinafter, each pixel circuit is referred to as a "B pixel circuit" when distinguished from other pixel circuits having different emission colors) 15 each including an organic EL element OL that emits blue light and forming a B subpixel are arranged alternately; and a pixel circuit column (hereinafter referred to as a "G pixel circuit column" or a "monochromatic pixel circuit column") in which only pixel circuits (hereinafter, each pixel circuit is referred to as a "G pixel circuit" when distinguished from other pixel circuits having different emission colors) 15 each including an organic EL element OL that emits green light and forming a G subpixel are arranged. In the display portion 11*b*, the RB pixel circuit columns and the G pixel circuit columns are alternately arranged, and four pixel circuits made up of one R pixel circuit, one B pixel circuit, and two G pixel circuits adjacent to each other constitute a display unit for displaying a color image. In the present embodiment as well, similarly to the first embodiment, the data signals S1 to Sm from the data-side drive circuit 30 correspond to m pixel circuit columns in the display portion 11*b*, respectively.

As illustrated in FIG. 16, in the display portion 11*b*, odd-numbered pixel circuit columns are RB pixel circuit columns, and for each RB pixel circuit column, two data signal lines Doj1, Dej1 are provided to extend along the each RB pixel circuit column (j1 is an odd number), and even-numbered pixel circuit columns are G pixel circuit columns, and for each G pixel circuit column, one data signal line Dj2 is provided to extend along the each G pixel circuit column (j2 is an even number). Therefore, in the display portion 11*b*, 3m/2 data signal lines Do1, De1, D2, Do3, De3, D4, . . . , Do(m−1), De(m−1), Dm are arranged in this order (m is an even number). In the display portion 11*b*, as in the first embodiment, n+1 (n is an integer of 2 or more) reset scanning signal lines (hereinafter also referred to simply as "reset signal lines") GA0 to GAn and n writing control scanning signal lines (hereinafter also referred to simply as "scanning signal lines") GB1 to GBn, which intersect the 3m/2 data signal lines, are disposed, and n emission control lines (emission lines) E1 to En are disposed along the n scanning signal lines GB1 to GBn, respectively.

Note that the display portion 11*b* is provided with n×m pixel circuits 15 as described above. The pixel circuits 15 are arranged in a matrix along the data signal lines Do1, De1, D2, Do3, De3, D4, . . . , Do(m−1), De(m−1), Dm and the scanning signal lines GB1 to GBn, and each pixel circuit 15 corresponds to any one of the data signal lines Do1, De1, D2, Do3, De3, D4, . . . , Do(m−1), De(m−1), Dm and corresponds to any one of the scanning signal lines GB1 to GBn (hereinafter, in the case of distinguishing each pixel circuit 15, a pixel circuit corresponding to the ith scanning signal line GBi in the jth pixel circuit column is referred to as "a pixel circuit in the ith row and the jth column" and denoted by reference sign "Pix(i, j)"). The n emission control lines E1 to En correspond to the n scanning signal lines GB1 to GBn, respectively. Therefore, each pixel circuit 15 also corresponds to any one of the n emission control lines E1 to En. In the configuration example illustrated in FIG. 16, when j is an odd number and i is also an odd number, the pixel circuit Pix(i, j) in the ith row and the jth column is connected to the data signal line Doj (hereinafter also referred to as an "odd-numbered row data signal line Doj"). When j is an odd number and i is an even number, the pixel circuit Pix(i, j) is connected to the data signal line Dej (hereinafter also referred to as an "even-numbered row data signal line Dej"). When j is an even number, the pixel circuit Pix(i, j) is connected to the data signal line Dj. The pixel circuit Pix(i, j) in the ith row and the jth column is also connected to the reset signal lines GAi−1, GAi, the scanning signal line GBi, and the emission control line Ei.

Furthermore, the signal distributor 5*j* is connected to the two data signal lines Doj, Dej provided along the jth pixel circuit column (RB pixel circuit column) that is the odd-numbered pixel circuit column (j=1, 3, . . . , m−1) (m is an even number). As in the first embodiment (FIG. 1), the data-side drive circuit 30 outputs m data signals D1 to Dm. Among the data signals S1 to Sm, the odd-numbered data signals S1, S3, . . . , Sm−1 are input to the signal distributors 51, 53, . . . , 5(*m*−1), respectively, and the even-numbered data signals S2, S4, . . . , Sm are applied to the data signal lines D2, D4, . . . , Dm provided along the even-numbered pixel circuit columns (G pixel circuit columns), respectively. Each signal distributor 5*j* can be implemented by a similar configuration to that of the signal distributor 5*j* in the first embodiment and is controlled by a similar switching control signal Csw to that in the first embodiment (see FIGS. 3 and 4). Thereby, each signal distributor 5*j* distributes the data signal Sj input thereto to the data signal line Doj and the data signal line Dej connected thereto. That is, by the signal distributor 5*j*, the data signal Sj is provided to the odd-numbered row data signal line Doj when indicating the voltage d(2k−1, j) to be provided to the odd-numbered pixel circuit Pix(2k−1, j) in the jth pixel circuit column, and the data signal Sj is provided to the even-numbered row data signal line Dej when indicating the voltage d(2k, j) to be provided to the even-numbered pixel circuit Pix(2k, j) in the jth pixel circuit column (k=1, 2, . . . , n/2; j=1, 2, . . . , m).

Configurations in the present embodiment except for the above are substantially the same as those in the first embodiment (FIGS. 1 to 4, 9, and 10). Hereinafter, in the configuration in the present embodiment, the same or corresponding parts as those in the first embodiment are denoted by the same reference numerals, and a detailed description thereof is omitted.

Figure 17:
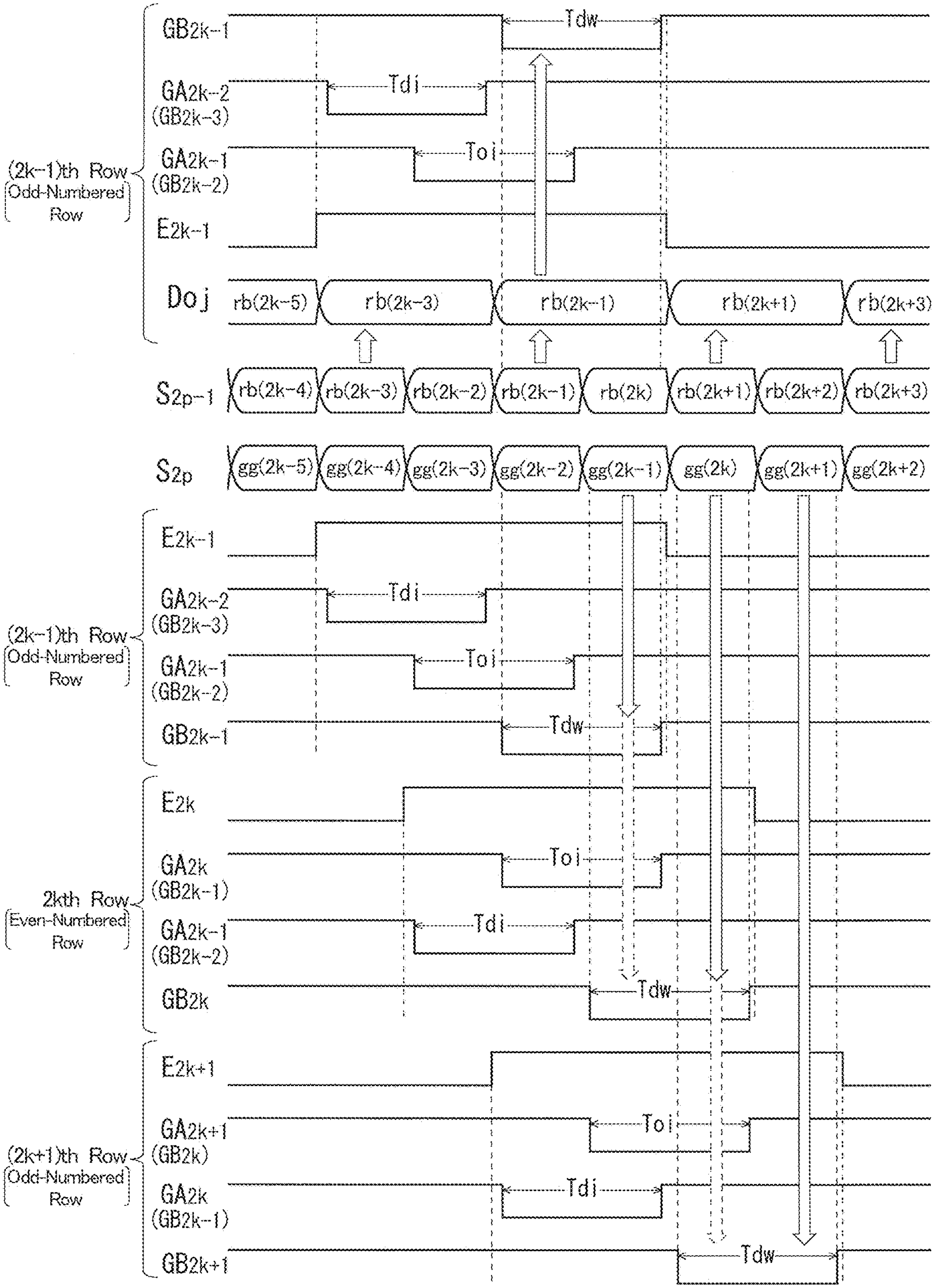
FIG. 17 is a timing chart for describing driving of a pixel circuit in the fourth embodiment.

FIG. 17 is a timing chart for describing the driving of the pixel circuit 15 in the present embodiment. As illustrated in FIG. 17, the reset signal lines GA0 to GAn and the scanning signal lines GB1 to GBn are driven in the same manner as in the first embodiment (see FIG. 10). Among the data signal lines Do1, De1, D2, Do3, De3, D4, . . . , Do(m−1), De(m−1), Dm, the odd-numbered row data signal line Do(2p−1) and the even-numbered row data signal line De(2p−1) provided along the (2p−1)th pixel circuit column (RB pixel circuit column), which is the odd-numbered pixel circuit column, are driven by the (2p−1)th data signal S2*p*−1 in the same manner as in the first embodiment via the signal distributor 5(2p−1) (see FIGS. 10 and 17). In FIG. 17, with respect to the driving of the odd-numbered pixel circuit columns, for convenience of illustration, only the data writing operation of driving the pixel circuit Pix(2k−1, 2p−1) in the (2k−1)th row and the (2p−1)th column by the odd-numbered data signal S2*p*−1 via the odd-numbered row data signal line Do(2p−1) is illustrated (j=2p−1). The data writing operation of driving the pixel circuit Pix(2k, 2p−1) in the 2kth row and the (2p−1)th column by the odd-numbered data signal S2*p*−1 via the even-numbered row data signal line De(2p−1) will be apparent to those skilled in the art from the following description, and hence the description thereof will be omitted. In FIG. 17, in the waveform indicating the odd-numbered data signal S2*p*−1, "rb(i)" is added to a portion indicating a voltage to be written into the ith pixel circuit Pix(i, 2p−1) in the (2p−1)th pixel circuit column (RB pixel circuit column) (i=1, 2, . . . , 2k−1, 2k, 2k+1, . . . , n).

On the other hand, in the present embodiment, among the data signal lines Do1, De1, D2, Do3, De3, D4, . . . , Do(m−1), De(m−1), Dm, the 2pth data signal line D2*p* is provided along the 2pth pixel circuit column (G pixel circuit column), which is the even-numbered pixel circuit column, and the 2pth data signal S2*p* is directly applied to the data signal line D2*p*, not via the signal distributor. Each of the scanning signal lines GB1 to GBn is driven in the same manner as in the first embodiment and is sequentially selected for two horizontal periods each with an overlap of one horizontal period. Thereby, the data writing operation is performed on each pixel circuit (i, 2p) in the 2pth pixel circuit column (G pixel circuit column) by the pre-charging and the main charging. For example, as illustrated in FIG. 17, when the 2pth data signal S2*p* indicates a voltage gg(2k−1) to be written into the pixel circuit Pix(2k−1, 2p), the (2k−1)th scanning signal line GB2*k*−1 is at L level (selected state), and the 2kth scanning signal line GB2*k* is also at L level (selected state). Hence the voltage gg(2k−1) is written as a data voltage into the pixel circuit Pix(2k−1, 2p) (the main charging is performed) and is also written into the pixel circuit Pix(2k, 2p), whereby the pixel circuit Pix(2k, 2p) is pre-charged. When the 2pth data signal S2*p* indicates a voltage gg(2k) to be written into the pixel circuit Pix(2k, 2p), the 2kth scanning signal line GB2*k* is at L level (selected state), and the (2k+1)th scanning signal line GB2*k*+1 is also at L level (selected state). Hence the voltage gg(2k) is written as a data voltage into the pixel circuit Pix(2k, 2p) (the main charging is performed) and is also written into the pixel circuit Pix(2k+1,2p), whereby the pixel circuit Pix(2k+1,2p) is pre-charged.

As described above, in the present embodiment, for the pixel circuit Pix(i, 2p−1) in each odd-numbered pixel circuit column (each RB pixel circuit column), data writing based on the data signal S2*p*−1 is performed via the two data signal lines made up of the odd-numbered row data signal line Do(2p−1) and the even-numbered row data signal line De(2p−1), and for the pixel circuit Pix(i, 2p) in each even-numbered pixel circuit column (each G pixel circuit column), data writing accompanied by the pre-charging is performed via one data signal line D2*p* (i=1, 2, . . . , 2k−1, 2k, n; p=1, 2, . . . , m/2). Thereby, it is possible to prevent insufficient charging in the writing of the data voltage into any of the R pixel circuit, the B pixel circuit, and the G pixel circuit. When the data voltage is written in this way, each pixel circuit 15 emits light in a color corresponding to the each pixel circuit 15 in accordance with the data voltage.

The driving of each pixel circuit 15 during this emission period is substantially the same as that in the first embodiment.

As can be seen from the above, in the present embodiment as well in which the RBGG pixel array structure is adopted (see FIG. 16), in the case of using the pixel circuit of the internal compensation system as illustrated in FIG. 2, even when the switching cycle of the data voltage output as a data signal from the data-side drive circuit is shortened due to, for example, an increase in resolution or the like, (the holding capacitor of) the inside of the pixel circuit can be sufficiently charged in accordance with the data voltage, and the display quality can be maintained satisfactorily.

5. Modifications

The disclosure is not limited to the above embodiments, and various modifications can be made so long as the modifications do not deviate from the scope of the disclosure.

For example, in each of the above embodiments, two data signal lines are provided for each pixel circuit column, but the connection relationship between the two data signal lines and each pixel circuit in the pixel circuit column is not limited to that illustrated in FIG. 7, FIG. 11, or the like. It may be configured such that n pixel circuits constituting each pixel circuit column are grouped into two pixel circuit groups with n/2 pixel circuits as one group, the two data signal lines correspond to the two pixel circuit groups, respectively, and each pixel circuit in the pixel circuit column is connected to a data signal line that corresponds to a pixel circuit group including the each pixel circuit. In this case, each signal distributor receives the data signal Sj corresponding to the two data signal lines connected to the each signal distributor among the data signals S1 to Sm output from the data-side drive circuit and distributes the data signal Sj to the two data signal lines such that the data signal Sj is applied to the data signal line connected to the pixel circuit connected to the scanning signal line in the selected state among the two data signal lines from the start time point of the selection period of the scanning signal line to the start time point of the selection period of the scanning signal line to be selected next.

Instead of the above configuration in which two data signal lines are provided for each pixel circuit column, a predetermined number, which is three or more, of data signal lines may be provided for each pixel circuit column, and the signal distributor may have a configuration corresponding thereto. In this case, each pixel circuit column corresponds to any one of two or more data signal line groups obtained by grouping n data signal lines in the display portion with the predetermined number of data signal lines as one group, one signal distributor is provided for each pixel circuit column, and the data signal line group corresponding to the each pixel circuit column is connected to the one signal distributor. Further, in this case, n pixel circuits constituting each pixel circuit column are grouped into a predetermined number of pixel circuit groups with a plurality of pixel circuits as one group, the predetermined number of data signal lines correspond to the predetermined number of the pixel circuit groups respectively, and each pixel circuit in the pixel circuit column is connected to a data signal line that corresponds to a pixel circuit group including the each pixel circuit. Moreover, in this case, each signal distributor receives the data signal Sj corresponding to one data signal line group connected to the signal distributor among the data signals S1 to Sm output from the data-side drive circuit and distributes the data signal Sj to the predetermined number, which is three or more, of data signal lines in the group such that the data signal Sj is applied to the data signal line connected to the pixel circuit connected to the scanning signal line in the selected state among the predetermined number of data signal lines from the start time point of the selection period of the scanning signal line to the start time point of a selection period of the scanning signal line to be selected next. Furthermore, the scanning-side drive circuit selectively drives the plurality of scanning signal lines such that the selection period of each scanning signal line partially overlaps the selection period of another scanning signal line in accordance with the number of data signal lines in one group. According to the modification with such a configuration, a longer data writing period can be ensured for each pixel circuit than in the first to third embodiments.

In the first and second embodiments, the overlap period between the selection period of each scanning signal line GBi driven by the scanning-side drive circuit and the selection period of the scanning signal line GBi1 to be selected next is not limited to the length specified above, and the selection periods of the two scanning signal lines GBi and GBi1 may overlap each other at least partially (i1=i+1 in the first embodiment, and i1=i+q in the second embodiment).

In each of the above embodiments, the configuration of the pixel circuit 15 is not limited to the configuration illustrated in FIG. 2, and a pixel circuit having another configuration that performs internal compensation may be used instead of the pixel circuit of FIG. 2. Further, the disclosure can be applied even when a pixel circuit not adopting the internal compensation system is used instead of the pixel circuit of FIG. 2. Even in the modification with such a configuration, it is possible to display an image satisfactorily without causing insufficient charging in the writing of the data voltage into the holding capacitor of the pixel circuit.

In each of the above embodiments, two data signal lines provided for one pixel circuit column are disposed only on one side of the pixel circuit column, but instead of this, one and the other of the two data signal lines may be disposed on one side and the other side of the pixel circuit column, respectively, in consideration of the viewpoint of layout design.

In the third embodiment, the DEMUX system having a multiplicity of 2 is adopted, but the DEMUX system having a multiplicity of 3 or more may be adopted. For example, in a case where the DEMUX system having a multiplicity of 3 is adopted, the data signal lines Do1, De1 to Dom, Dem in the display portion are grouped into m data signal line groups with two data signal lines consisting of the odd-numbered row data signal line Doj and the even-numbered row data signal line Dej, as one group, and the m data signal line groups are grouped into m/3 sets with three data signal line groups as one set (here, m is a multiple of 3). Further, m/3 signal distributors 61 to 6($m/3$) respectively corresponding to the m/3 sets are provided, and to each signal distributor, three data signal line groups in the corresponding set are connected. The data-side drive circuit outputs m/3 data signals S1 to Sm/3 and provides the data signals S1 to Sm/3 to the m/3 signal distributors 61 to 6($m/3$), respectively. According to such a modification, it is possible to sufficiently charge the holding capacitor in the pixel circuit in accordance with the data voltage while further reducing the number of output terminals and the circuit amount of the data-side drive circuit 30.

Note that any of the first to fourth embodiments and modifications thereof may be combined within a range not contradictory to the gist of the disclosure and not technically contradictory.

In the above, the embodiments and the modifications thereof have been described by taking the organic EL display device as an example, but the disclosure is also applicable to a display device, except for the organic EL display device, using a display element driven by a current. The display element that can be used here is a display element with its luminance, transmittance, and the like, controlled by a current, and for example, an inorganic light-emitting diode, a quantum dot light-emitting diode (QLED), and the like can be used in addition to the organic EL element, that is, the organic light-emitting diode (OLED). The disclosure is also applicable to a display device except for a display device using a display element driven by a current, the display device using a pixel circuit that includes a capacitor for holding a voltage corresponding to the data voltage and has luminance controlled in accordance with the holding voltage of the capacitor, for example, an active matrix-type liquid crystal display device.

DESCRIPTION OF REFERENCE CHARACTERS

10, 10*b*: Organic EL Display Device
11, 11*b*: Display Portion
15: Pixel Circuit
Pix(j,i): Pixel Circuit (i=1 to n, j=1 to m)
20: Display Control Circuit
30: Data-Side Drive Circuit (Data Signal Line Drive Circuit)
40: Scanning-Side Drive Circuit (Scanning Signal Line Dl/Emission Control Circuit)
5*j*: Signal Distributor (j=1 to m)
6*j*: Signal Distributor (j=1 to m/2)
GAi: Reset Scanning Signal Line (Reset Signal Line) (i=0 to n)
GBi: Writing Control Scanning Signal Line (Scanning Signal Line) (i=1 to n)
Ei: Emission Control Line (i=1 to n)
Dj: Data Signal Line (j=1 to m)
Vini: Initialization Voltage Supply Line, Initialization Voltage
ELVDD: High-Level Power Line (First Power Line), High-Level Power Supply Voltage
ELVSS: Low-Level Power Line (Second Power Line), Low-Level Power Supply Voltage
OL: Organic EL Element (Display Element)
Cst: Holding Capacitor
M1: Drive Transistor
M2: Writing Control Transistor (Writing Control Switching Element)
M3: Threshold Compensation Transistor (Threshold Compensation Switching Element)
M4: First Initialization Transistor (First Initialization Switching Element)
M5: First Emission Control Transistor (First Emission Control Switching Element)
M6: Second Emission Control Transistor (Second Emission Control Switching Element)
M7: Second Initialization Transistor (Second Initialization Switching Element)
Sj: Data Signal (j=1 to m)
Va: Anode Voltage
Vg: Gate Voltage
Wsw: Writing Control Switch
PxR, PxG, PxB: Pixel Part

The invention claimed is:

1. A method for driving a display device including a plurality of data signal lines, a plurality of scanning signal lines intersecting the plurality of data signal lines, and a plurality of pixel circuits arranged along the plurality of data signal lines and the plurality of scanning signal lines, the method comprising:

a data-side driving step of outputting a plurality of data signals representing an image to be displayed;

a signal distribution step of receiving the plurality of data signals and providing the plurality of data signals to the plurality of data signal lines; and a scanning-side driving step of selectively driving the plurality of scanning signal lines such that a selection period of each of the scanning signal lines has a portion overlapping with a selection period of a scanning signal line to be selected next; wherein the plurality of pixel circuits define a plurality of pixel circuit columns extending along the plurality of data signal lines, the plurality of scanning signal lines are respectively connected to ones of the plurality of pixel circuits defining each of the plurality of pixel circuit columns, the plurality of pixel circuit columns are arranged such that two-color pixel circuit columns each having a first color pixel circuit and a second color pixel circuit arranged alternately and monochromatic pixel circuit columns each having only third color pixel circuits are alternately arranged in a direction in which the plurality of scanning signal lines extend, the plurality of data signal lines include a plurality of two-color data signal line groups that are a plurality of data signal line groups with two data signal lines as one group and respectively correspond to a plurality of two-color pixel circuit columns in the plurality of pixel circuit columns, and a plurality of monochromatic data signal lines that respectively correspond to a plurality of monochromatic pixel circuit columns in the plurality of pixel circuit columns, a first color pixel circuit and a second color pixel circuit included in each two-color pixel circuit column in the plurality of pixel circuit columns are respectively connected to one and the other of two data signal lines in a data signal line group corresponding to the each two-color pixel circuit column, and all pixel circuits included in each monochrome pixel circuit column in the plurality of pixel circuit columns are connected to one data signal line corresponding to the each monochrome pixel circuit column, the plurality of data signals correspond to the plurality of pixel circuit columns, respectively, in the signal distribution step, a data signal corresponding to each two-color pixel circuit column in the plurality of pixel circuit columns is distributed to two data signal lines in a data signal line group corresponding to the each two-color pixel circuit column, a data signal corresponding to each monochrome pixel circuit column in the plurality of pixel circuit columns is provided to one data signal line corresponding to the each monochrome pixel circuit column, and one data signal among the plurality of data signals is distributed to the two data signal lines such that for each pixel circuit connected to each data signal line of the two data signal lines, the one data signal is applied to the each data signal line in a first period that is included in a corresponding selection period and does not overlap with a following selection period, and such that a voltage of the one data signal applied in the first period is held in the each data signal line with capacitance thereof by electrically disconnecting the each data signal line from the one data signal in a second period that is included in the corresponding selection period and overlaps with the following selection period, wherein the corresponding selection period is a selection period of a scanning signal line connected to the each pixel circuit, and the following selection period is a selection period of a scanning signal line to be selected next.

2. A display including a plurality of data signal lines, a plurality of scanning signal lines intersecting the plurality of data signal lines, and a plurality of pixel circuits arranged along the plurality of data signal lines and the plurality of scanning signal lines, the display device comprising:

a data-side drive circuit configured to output a plurality of data signals representing an image to be displayed;

a signal distribution circuit configured to receive the plurality of data signals and provide the plurality of data signals to the plurality of data signal lines; and a scanning-side drive circuit configured to selectively drive the plurality of scanning signal lines such that a selection period of each of the scanning signal lines has a portion overlapping with a selection period of a scanning signal line to be selected next, wherein the plurality of pixel circuits constitute a plurality of pixel circuit columns extending along the plurality of data signal lines, the plurality of pixel circuit columns are arranged such that two-color pixel circuit columns each having a first color pixel circuit and a second color pixel circuit arranged alternately and monochromatic pixel circuit columns each having only third color pixel circuits are alternately arranged in a direction in which the plurality of scanning signal lines extend, the plurality of data signal lines include a plurality of two-color data signal line groups that are a plurality of data signal line groups with two data signal lines as one group and respectively correspond to a plurality of two-color pixel circuit columns in the plurality of pixel circuit columns, and a plurality of monochromatic data signal lines that respectively correspond to a plurality of monochromatic pixel circuit columns in the plurality of pixel circuit columns, a first color pixel circuit and a second color pixel circuit included in each two-color pixel circuit column in the plurality of pixel circuit columns are respectively connected to one and the other of two data signal lines in a data signal line group corresponding to the each two-color pixel circuit column, and all pixel circuits included in each monochrome pixel circuit column in the plurality of pixel circuit columns are connected to one data signal line corresponding to the each monochrome pixel circuit column, the plurality of data signals correspond to the plurality of pixel circuit columns, respectively, the signal distribution circuit distributes a data signal corresponding to each two-color pixel circuit column in the plurality of pixel circuit columns to two data signal lines in a data signal line group corresponding to the each two-color pixel circuit column, and provides a data signal corresponding to each monochrome pixel circuit column in the plurality of pixel circuit columns to one data signal line corresponding to each of the monochrome pixel circuit columns, the signal distribution circuit distributes a data signal corresponding to each two-color pixel circuit column to two data signal lines in a data signal line group corresponding to the each two-color pixel circuit column such that for each pixel circuit connected to each data signal line of the two data signal lines, the corresponding data signal is applied to the each data signal line in a first period that is included in a corresponding selection period and does not overlap with a following selection period, and such that a voltage of the corresponding data signal applied in the first period is held in the each data signal line with capacitance thereof by electrically disconnecting the each data signal line from the data-side drive circuit in a second period that is included in the corresponding selection period and overlaps with the following selection period, wherein the corresponding selection period is a selection period of a scanning signal line connected to the each pixel circuit, and the following selection period is a selection period of a scanning signal line to be selected next, and the data-side drive circuit outputs the plurality of data signals such that for each pixel circuit in each two-color pixel circuit column, a data signal indicating a data voltage to be written to the each pixel circuit is provided to the signal distribution circuit in a period that is included in a selection period of a scanning signal line connected to the each pixel circuit and does not overlap with a selection period of a scanning signal line to be selected next, and such that for each pixel circuit in each monochromatic pixel circuit column, a data signal indicating a data voltage to be written to the each pixel circuit is provided to a data signal line corresponding to the each monochromatic pixel circuit column in a period that is included in a selection period of a scanning signal line connected to the each pixel circuit and overlaps with a selection period of a scanning signal line to be selected next.

* * * * *